United States Patent
Agboatwalla et al.

(10) Patent No.: US 7,802,207 B2
(45) Date of Patent: Sep. 21, 2010

(54) SYSTEM, METHOD, AND ARTICLE OF MANUFACTURE FOR GENERATING A CUSTOMIZABLE NETWORK USER INTERFACE

(75) Inventors: Adnan M. Agboatwalla, Fremont, CA (US); Adnan H. Lawai, Menlo Park, CA (US); Ashwin R. Kamath, Fremont, CA (US); Umair A. Khan, Fremont, CA (US); Wasiq M. Bokhari, Fremont, CA (US)

(73) Assignee: NVIDIA International, Inc., St. Michael (BB)

( * ) Notice: Subject to any disclaimer, the term of this patent is extended or adjusted under 35 U.S.C. 154(b) by 990 days.

(21) Appl. No.: 10/165,454

(22) Filed: Jun. 6, 2002

(65) Prior Publication Data
US 2003/0120599 A1    Jun. 26, 2003

Related U.S. Application Data

(60) Provisional application No. 60/340,405, filed on Dec. 13, 2001.

(51) Int. Cl.
*G06F 3/00* (2006.01)
(52) U.S. Cl. .................... 715/866; 715/733; 715/810
(58) Field of Classification Search .............. 715/536, 715/866, 501.1, 733, 810
See application file for complete search history.

(56) References Cited

U.S. PATENT DOCUMENTS

| 5,231,577 | A  | * | 7/1993  | Koss ............................ 715/210 |
| 5,513,348 | A  | * | 4/1996  | Ryu et al. ...................... 707/1 |
| 6,327,628 | B1 | * | 12/2001 | Anuff et al. .................. 719/311 |
| 6,460,046 | B1 | * | 10/2002 | Meek .......................... 707/102 |
| 6,630,943 | B1 | * | 10/2003 | Nason et al. ................. 715/746 |
| 6,748,420 | B1 | * | 6/2004  | Quatrano et al. ............ 709/205 |
| 6,820,055 | B2 | * | 11/2004 | Saindon et al. ............. 704/235 |
| 2001/0030667 | A1 | * | 10/2001 | Kelts .......................... 345/854 |
| 2002/0138581 | A1 | * | 9/2002  | MacIntosh et al. .......... 709/206 |

* cited by examiner

*Primary Examiner*—Kieu Vu
*Assistant Examiner*—Michael Roswell
(74) *Attorney, Agent, or Firm*—Zilka-Kotab, PC

(57) ABSTRACT

A method for generating a user-sharable network user interface is provided. A management interface is displayed. The management interface allows a user to select and manage information displayed on an information screen. The user is allowed to select information available in content sources. The selected information of the content source is marked and stored. The marked information is retrieved and displayed on the information screen. A second user is allowed to see the window of the information screen of the first user if the second user is authorized. The user is allowed to interact with customization tools via a wireless device for customizing the management interface. A pattern can be replayed for retrieving data for display. An application can be invoked for providing data for display. The information can also be translated.

28 Claims, 26 Drawing Sheets

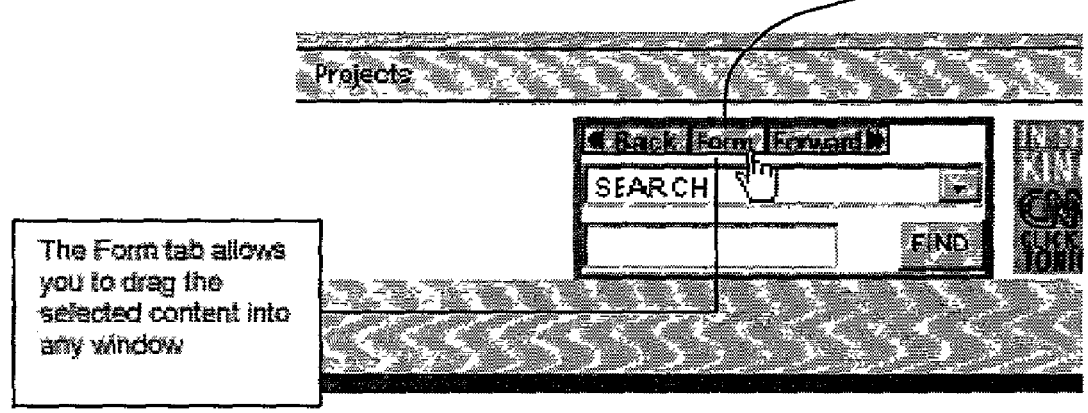
Fig. 20

SYSTEM, METHOD, AND ARTICLE OF MANUFACTURE FOR GENERATING A CUSTOMIZABLE NETWORK USER INTERFACE

RELATED APPLICATIONS

This application claims priority from U.S. Provisional Patent Application Ser. No. 60/340,405 entitled SYSTEM, METHOD AND ARTICLE OF MANUFACTURE FOR GENERATING A CUSTOMIZABLE NETWORK USER INTERFACE, filed Dec. 13, 2001. This application is also a continuation in part of U.S. Patent Application entitled SYSTEM, METHOD, AND ARTICLE OF MANUFACTURE FOR GENERATING A CUSTOMIZABLE NETWORK USER INTERFACE, filed non-provisionally Jun. 7, 2001 under Ser. No. 09/876,671, which claims priority from Provisional U.S. Patent Application entitled SYSTEM, METHOD, AND ARTICLE OF MANUFACTURE FOR GENERATING A CUSTOMIZED NETWORK USER INTERFACE, filed Jun. 7, 2000 under Ser. No. 60/209,873 and assigned to common assignee Clickmarks Inc. This application claims priority from Provisional U.S. Patent Application entitled SYSTEM, METHOD AND COMPUTER PROGRAM PRODUCT FOR AN INFORMATION HUB, filed provisionally Apr. 12, 2001 under Ser. No. 60/283,775. This application is also a continuation in part of U.S. Patent Application entitled SYSTEM, METHOD AND COMPUTER PROGRAM PRODUCT FOR AN INFORMATION HUB, filed non-provisionally Jul. 13, 2001 under Ser. No. 09/905,678. This application also claims priority from Provisional U.S. Patent Application entitled SYSTEM, METHOD AND COMPUTER PROGRAM PRODUCT FOR THE RECORDING AND PLAYBACK OF TRANSACTION MACROS filed provisionally Apr. 12, 2001 under Ser. No. 60/283,781 and U.S. Patent Application entitled SYSTEM, METHOD AND COMPUTER PROGRAM PRODUCT FOR THE RECORDING AND PLAYBACK OF TRANSACTION MACROS filed non-provisionally Aug. 28, 2001 under Ser. No. 09/942,047. This application is also a continuation in part of U.S. patent application entitled METHOD, SYSTEM AND APPARATUS FOR MULTILINGUAL TEXT PROCESSING, filed Jul. 28, 1999 under Ser. No. 09/363,066. Each of the foregoing is incorporated herein by reference in its entirety for all purposes

FIELD OF THE INVENTION

The present invention relates to user interfaces and more particularly to generating and managing network-based user interfaces.

BACKGROUND OF THE INVENTION

Information on the Internet exists in the form of hyperlinks that appear in different HTML pages. A news site for example may contain headlines that are hyperlinks to their detailed exposition. Similarly, a company's intranet may contain multiple pages with several hyperlinks on each.

Custom Internet portals to display web-centric information exist (e.g., myYahoo, myLycos etc.). These portals aggregate information from different HTML sources into one interface where it can be accessed through one interface. However, the possible number of sources from which information is aggregated is fairly minimal. In typical portals, the user chooses from pre-selected information collected from a pre-determined set of information sources. The user has no control over either the sources he/she gets the content from or the information that is harvested from those web-sites. Further, the user has very little control over how the information is presented.

For example, if the user is interested in Indian politics, Soccer, and Semiconductor High Tech companies, myYahoo allows the user to configure Yahoo's news source to filter through news on these topics. However, the user must take all this content strictly from Yahoo-selected content providers. This arrangement prohibits users from choosing not just the type of content but the source of the content as well. While, for example, a user may want to be able to receive world politics news from his two favorite Indian news dailies every morning, get his Hi-Tech news coverage from Red Herring and CNET, and get sports news from Cricket.org and dailysoccer.com, access to all these sites through a prior art internet portal would be predicated on the Internet portal offering access to all of the particular site via that particular portal. This limitation forces the users to have access to only "popular" sources of information and effectively bars them from getting anything else.

What is needed is a method that allows the user to completely configure both the source and content that he/she wants on his/her own portal. The present invention overcomes the above-described disadvantages by providing a method, system, and article of manufacture that allows a user to aggregate any content or data from any source into a single customizable network user interface of his/her choice.

SUMMARY OF THE INVENTION

A method for generating a user-sharable network user interface is provided. A management interface is displayed. The management interface allows a user to select and manage information displayed on an information screen of a habitat. The management interface includes information of one or more content sources. The user is allowed to select portions of the information available in the content sources. The selected information of the content source is marked and stored. The marked information is retrieved and displayed on the information screen. The information screen includes at least one view. Each view contains at least one window for displaying the marked information. A permission status of a second user is checked to determine whether the second user is authorized to see a window. The second user is allowed to see the window of the information screen of the first user if the second user is authorized.

The first user may set permissions for allowing other users to view view(s) and/or window(s). As an option, the second user can add and/or remove content from the window. Preferably, a notice saying the window is shared is sent to the second user.

A method for customizing a network user interface is also provided. A management interface is displayed on a wireless device for allowing a user to select and manage information displayed on an information screen. The management interface includes information of one or more content sources and customization tools. The user is allowed to select portions of the information available in the content source(s). The selected information of the content source(s) is marked and stored for subsequent output on the information screen. The user is allowed to interact with the customization tools via the wireless device for customizing the management interface.

The customization that can be performed using the tools on the management interface can include adding and/or deleting a window to the information screen, the window being for displaying at least a portion of the marked content; adding and/or deleting a view, the view including a plurality of windows; adding a row of windows to a view; and changing user profile information. Illustrative wireless devices are a wireless telephone, a Personal Digital Assistant (PDA), a handheld computer such as a handheld PC or a Blackberry-type device, and a pager.

A system, method and computer program product for generating a customizable network user interface are provided according to one embodiment. A management interface, that allows a user to select and manage information displayed on an information screen, is presented. Specification of a transaction pattern is received. The pattern performs an interaction with a remote data source, which can be a remote application, web page, a legacy application, etc., for retrieving data upon replay of the pattern. The pattern is replayed for retrieving the data. The information selected by the user on the management interface and the data retrieved upon replay of the pattern are displayed on the information screen.

According to one embodiment, the execution of the transaction pattern includes submission of required parameters during the transaction. The execution of the transaction pattern can involve automatic navigation during the transaction.

Another method for generating a customizable network user interface is provided according to an embodiment. A management interface is displayed for allowing a user to select and manage information displayed on an information screen. A specification of an application to invoke is received. The application is interfaced with for invoking the application. Data is received from the invoked application. User-selected information and the data received from the application are displayed on the information screen.

A method for managing an enterprise network data interface system is provided according to one embodiment. Identification information is assigned to data of an enterprise (i.e., business or organization). Enterprise data can include documents, email, spreadsheets, data in a database, web content, output of other applications, or any other type of data. Users are allowed to access the data via a habitat based on access privileges. The users are assigned to groups, which are tiered. Selected identification information of the enterprise data can be associated with each group. Users in a particular group are allowed to access data associated with their particular access tier. Users in a particular group are also allowed to access data associated with a group in a lower tier. Administrative privileges to the data interface system are controlled. The administrative privileges are also tiered. A user on a particular administrative tier has administrative rights over all users in lower administrative tiers.

The administrative privileges can include adding user accounts, deleting user accounts, editing user accounts, searching user accounts, setting data access privileges, assigning users to the access and/or administrative tiers, associating data with the access tiers, etc. As an option, deleted user accounts can be archived. This allows them to be reactivated at a later time. Users can be assigned to groups based on an organization structure (such as an employee hierarchy) of the enterprise. Preferably, a user with administrative privileges assigns users to groups.

A method for generating a network user interface with sharable data is provided. A management interface, that allows a user to select and manage information displayed on an information screen of a habitat, is displayed. The management interface includes information of at least one content source. The user is allowed to select portions of the information available in the content source(s). The selected information of the content source is marked. The marked information is stored in the habitat for subsequent output on the information screen. An external application is allowed to access the marked information in storage and/or when displayed for extracting data therefrom. The external application can also be allowed to add data to the habitat.

A method for providing a customizable network user interface is provided. A management interface is displayed. The management interface allows a user to select and manage information displayed on an information screen of a habitat, where the management interface includes information of at least one content source. The user is allowed to select portions of the information available in the at least one content source. The selected information is marked and stored. The marked information is retrieved from storage and translated to a different human language than it was in as stored. For example the translation could be from English to Japanese, etc. The translated information is displayed on the information screen.

The marked information can be textual, in which case, the information is displayed in the character set of the language translated to. The marked information can also include audio data. The audio data can also be translated to a different language and output.

BRIEF DESCRIPTION OF THE DRAWINGS

The invention will be better understood when consideration is given to the following detailed description thereof. Such description makes reference to the annexed drawings wherein:

FIG. 20 is a drawing of a screen used for adding web page forms to the EH.

DETAILED DESCRIPTION OF THE PREFERRED EMBODIMENTS

Figure 1:
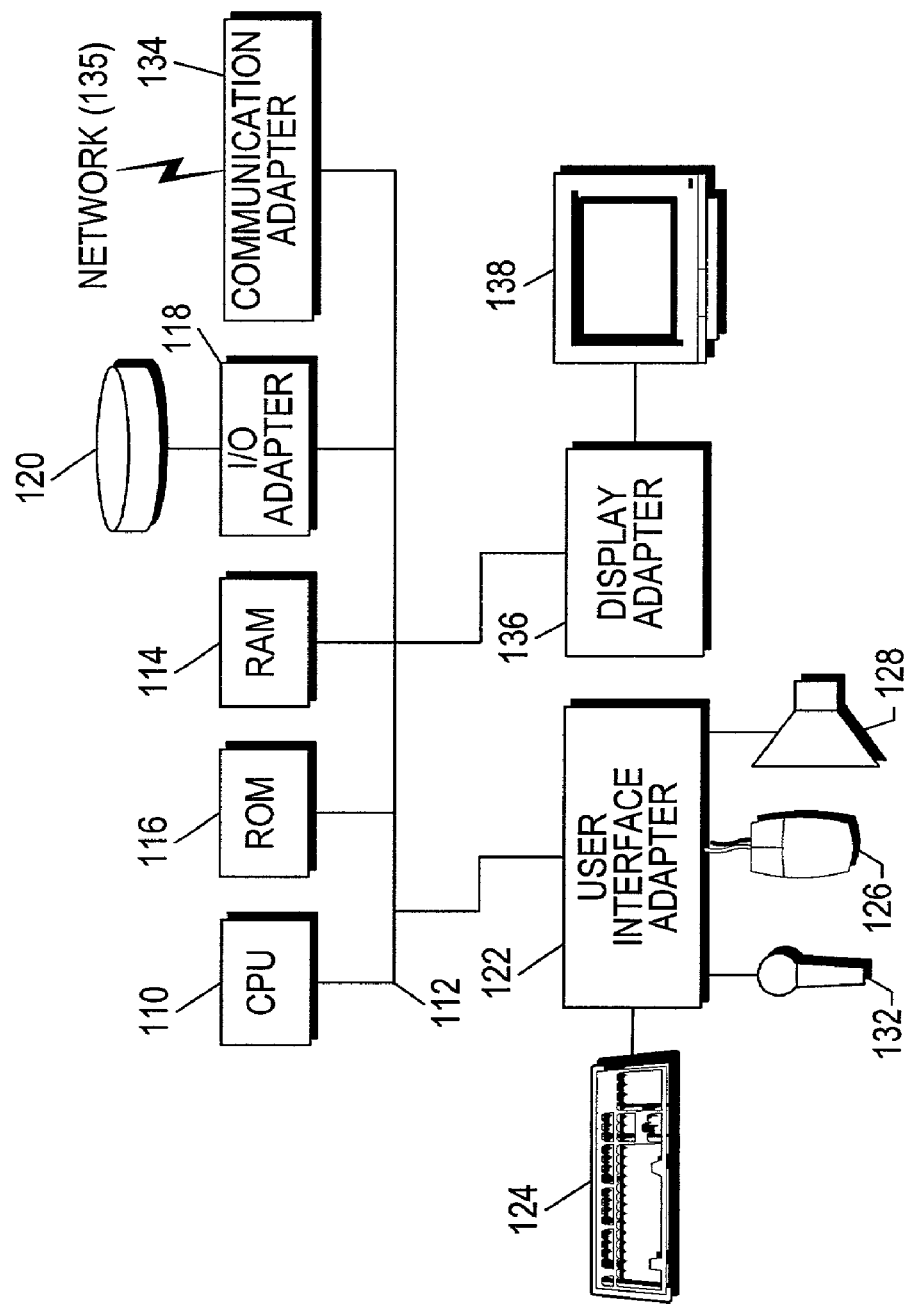
FIG. 1 is a schematic diagram of a hardware implementation of one embodiment.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that can be called when those individual behaviors are wanted in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

The present invention allows a user to create an information portal whose information sources and content is completely customizable. Information on the internet exists in the form of hyperlinks that appear in different HTML pages. A news site for example may contain headlines that are hyperlinks to their detailed exposition. Similarly, a company's intranet may contain multiple pages with several hyperlinks on each. In typical portals, the user chooses from a predetermined set of information collected from a pre-determined set of information sources. The user has no control over either the sources he/she gets the content from or the information that is harvested from those web-sites. Further, the user has very little control over how the information is presented.

Figure 2:
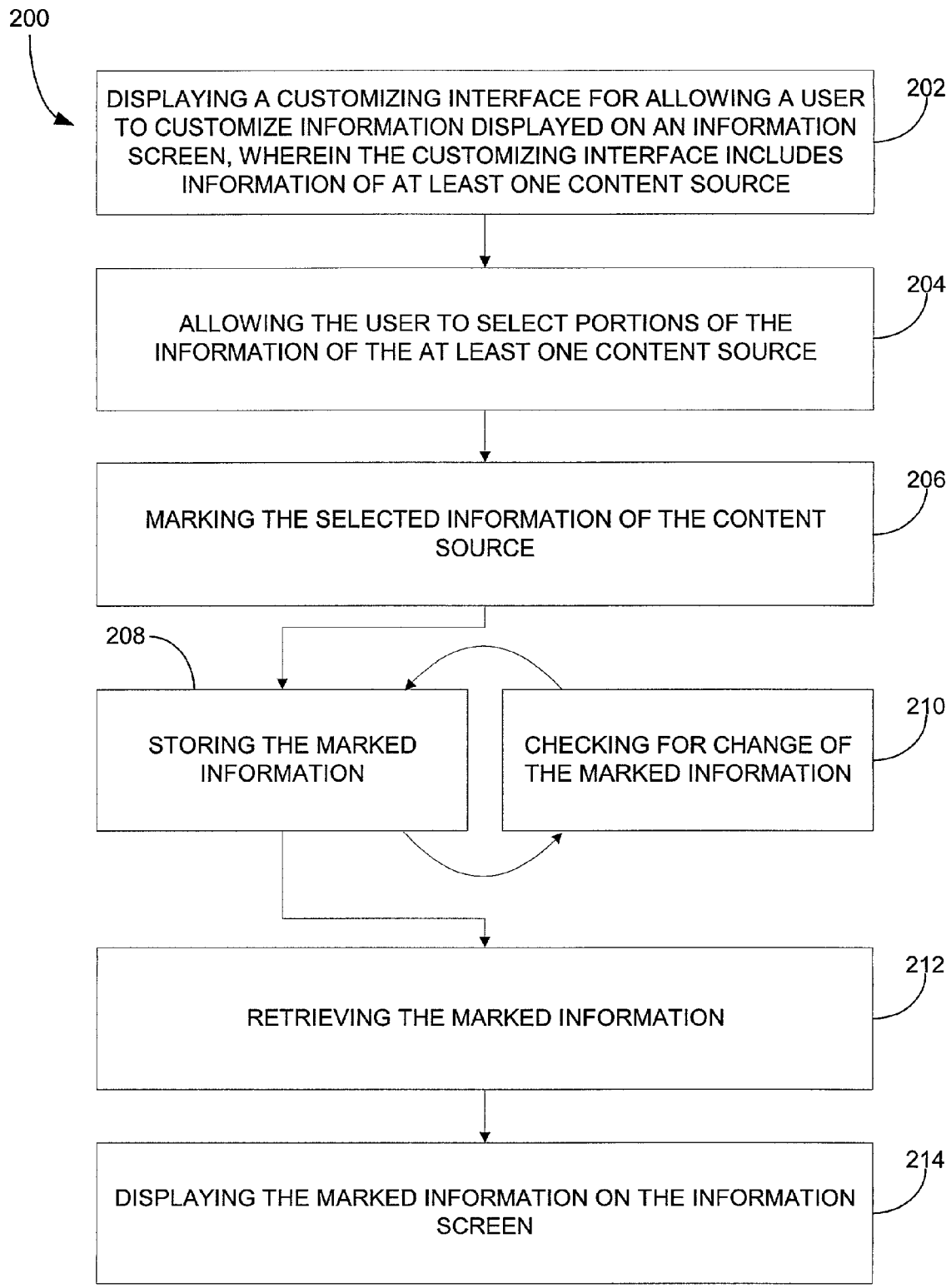
FIG. 2 illustrates a process for generating a customized network user interface according to one embodiment.

FIG. 2 illustrates a process 200 for generating a customizable network user interface. A management interface is provided in operation 202. The management interface allows a user to select and manage information that is displayed on an information screen and viewed by the user. The management interface includes information of at least one content source which can be selected. It should be noted that such information can include such things as portions of web pages, links to web pages, images, active graphics, audio content or any other type of information. Such a content source can be a web page or any other content source. In operation 204, the user is further allowed to select portions of the information available in one or more of the content sources. The information selected from the content source may then be marked in operation 206. The information selected from the content source may then be marked through various means, such as for example highlighting, dragging-and-dropping, selecting from a menu, menu-based tagging (R+click), and/or an action through an input device, such as a mouse, touchpad, etc.

In operation 208, such marked information is stored for subsequent retrieval in operation 212. The marked information can be output to the user via the information screen. Over time, the information that has been marked on the remote content source may change. To allow current and updated information to be presented to the user via the information screen, a check is performed in operation 210 to determine whether any of the marked information has changed on the content source. Preferably, the check is performed periodically or upon occurrence of some event. The marked information is retrieved in operation 212. In operation 214, the marked information may then be retrieved manually or automatically from the content source and displayed on the information screen.

In one embodiment of the present invention, the information screen may include a plurality of different views pages or "views". Each view may contain at least one section or a "window" for displaying the marked information. Further, the user may be allowed to select, maximize, minimize, refresh and edit the content of the window.

In another embodiment of the present invention, the user may be allowed to share the views with other users such as via electronic mail or by permitting access to the views. As an option, the marked information may be presented on the information screen over a configurable number of days in the past. Further, the user may be allowed to "drag and drop" information of his/her choice from the customizing interface to the information screen. As mentioned above, desired information can also be added to the information screen through various means, such as for example highlighting, selecting from a menu, menu-based tagging (R+click), and/or an action through an input device, such as a mouse, touchpad, etc. The information may also be marked upon dropping the information in the information screen.

In still yet another embodiment, the step or act of marking the selected information may include determining an invariant descriptor of the selected information and/or of the tables, rows, columns, and/or cells comprising the selected information. The invariant descriptor may consist of a description of the location of the selected information within its source and of various distinguishing attributes of the sub-section(s) of the source that contain the selected information. Further, the step or act of checking for change of the marked information may include the steps or acts of determining whether the content of the marked information has changed and determining whether the format of the marked information has changed. As yet another option, the step or act of checking for change of the marked information may be performed at predetermined intervals.

Based upon the invariant descriptor, the selected information may be retrieved manually (i.e., by the user) or automatically and displayed in the appropriate views/windows of the customized information screen.

According to a preferred embodiment of the present invention, the user is presented with a page that contains the user's information of choice from an arbitrary number of different sources and presented in a completely customizable format. The page consists of different "views" where each view in turn contains multiple windows. The number of views and the number of windows in each view can be configured.

Each particular window contains hyperlinks that have been selected by the user from web-sites of his/her choice. A window may for instance be dedicated for international news and could contain hyperlinks selected by the user from any number of web-sites of his/her choice. The user has complete freedom in selecting the source of his/her content (i.e. the web-site) and the content from that source (i.e. the hyperlinks).

Figure 3:
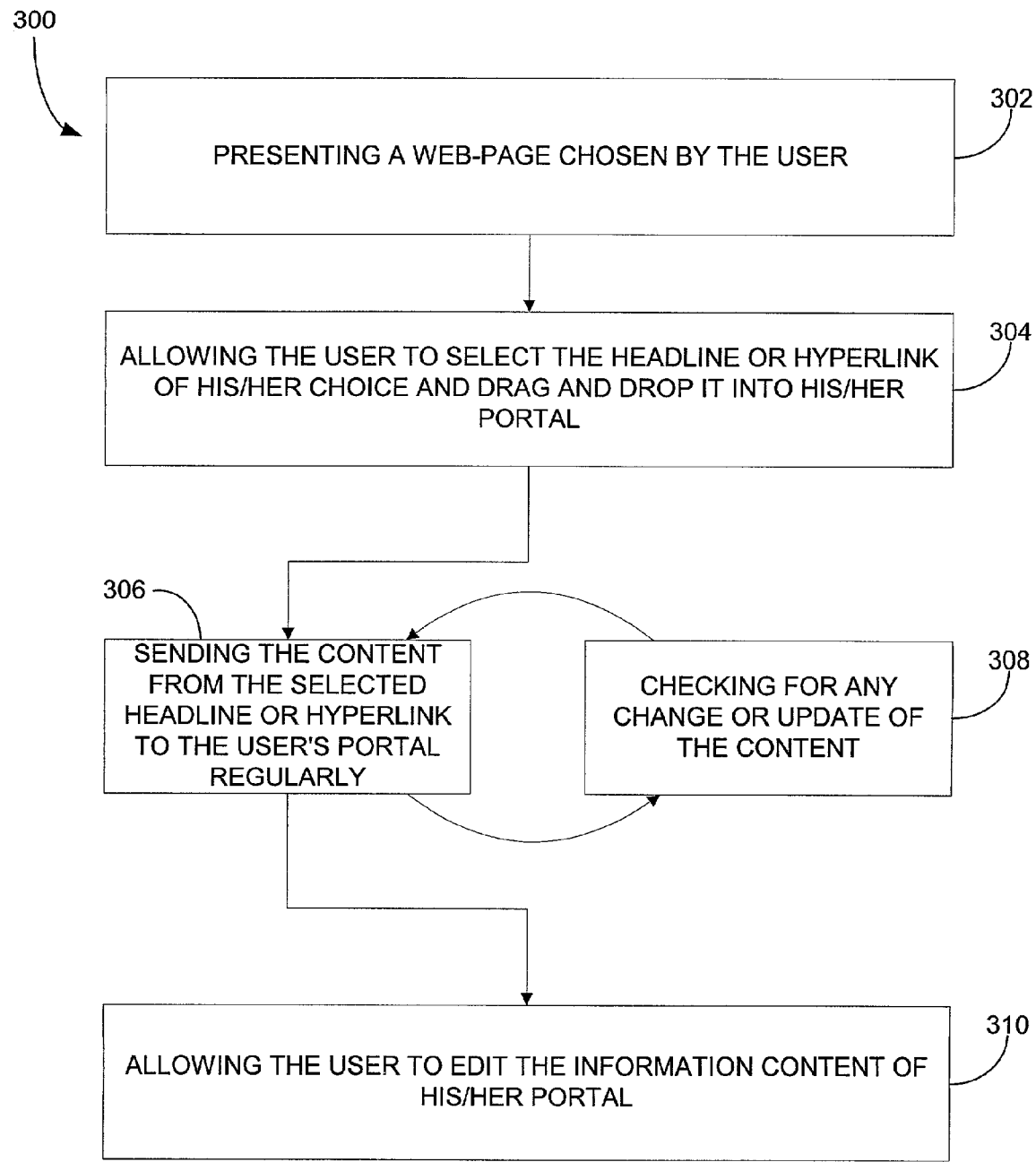
FIG. 3 is a flowchart of a process for allowing a user to customize an information portal according to one embodiment.

FIG. 3 is a flowchart of a process 300 for allowing a user to customize an information portal according to one embodiment of the present invention. When the user wishes to add content, a web-page chosen by the user is presented in operation 302. In operation 304, the user is then allowed to select the headline or hyperlink of his/her choice and simply drags and drops it into his/her portal. From that point on, in operation 306, the content from that headline or hyperlink will be brought to the user's portal regularly. In operation 308, a check for any change or update of the content is made. If the content changes or is refreshed, the new content will be brought to the user. In operation 310, the user is further allowed to edit the content of his/her portal at will by adding or deleting headlines, moving them from one window to another within a view or moving them to other windows in different views.

Another embodiment of the present invention includes the following parts: (a) An interface that displays the user customized information, (b) an interface that allows the user to select and manage the information of choice, (c) a mechanism for marking selected information contained in a web-page (d) a method for communicating that information to the backend servers that process and store that information, (e) a mechanism for the storage of the selected information (f) a mechanism for regularly retrieving selected information and (g) a mechanism for checking for change in the content or the format of the selected sources of information.

The user interface to display preferred content.

The user interface comprises "views", each of which contain multiple windows. The number of windows in a view is completely configurable. The user may create or delete as many views as he/she may desire. This user interface allows a user to cleanly categorize related information within individual windows and views. This provides a user one place to access all of his/her favorite information and content from the web. This content includes (but is not limited to) (a) News and Information headlines (of all sorts) (b) Information about email, bank and other accounts (c) Information about shopping and comparison of rates and prices (d) Graphs, Images, Sounds or any other media.

This content is presented to the user with an ability to edit and manage it intuitively and interactively. Some of the features of the management process include (a) a presentation of the user's selected information over a configurable number of days in the past (b) an ability to select, maximize, minimize, refresh or edit the content of individual windows (c) to "publish" user's views into a directory of views and (d) to share these views with other people by emailing them the views.

The interface for selection and management of preferred content.

The interface that allows the user to create his/her customized portal is based on an intuitive drag and drop capability. The user simply selects the sources or headlines of choice and drags and drops them into windows and views of choice. The drag and drop feature also makes customization very easy for the user, allowing quick compilation and management of their preferred content. There are two levels of selection and management provided, default and advanced.

Figure 4:
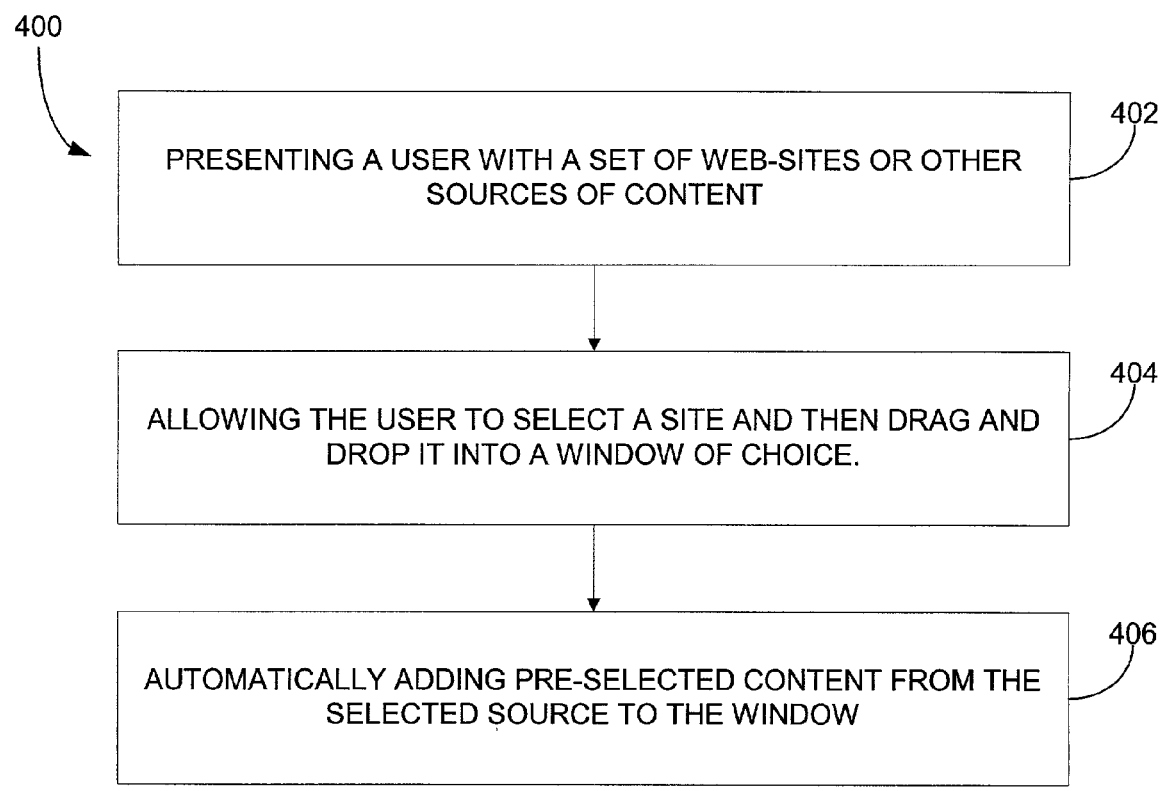
FIG. 4 depicts a default mode process for allowing selection and management of preferred content according to one embodiment.

Referring to FIG. 4, in a default mode process 400 for allowing selection and management of preferred content according to one embodiment of the present invention, a user is presented with a set of web-sites or other sources of content in operation 402. In operation 404, the user is allowed to select a site and then drag and drop it into a window of choice.

Once that is done, pre-selected content from that source is automatically added to the window in operation 406.

Figure 5:
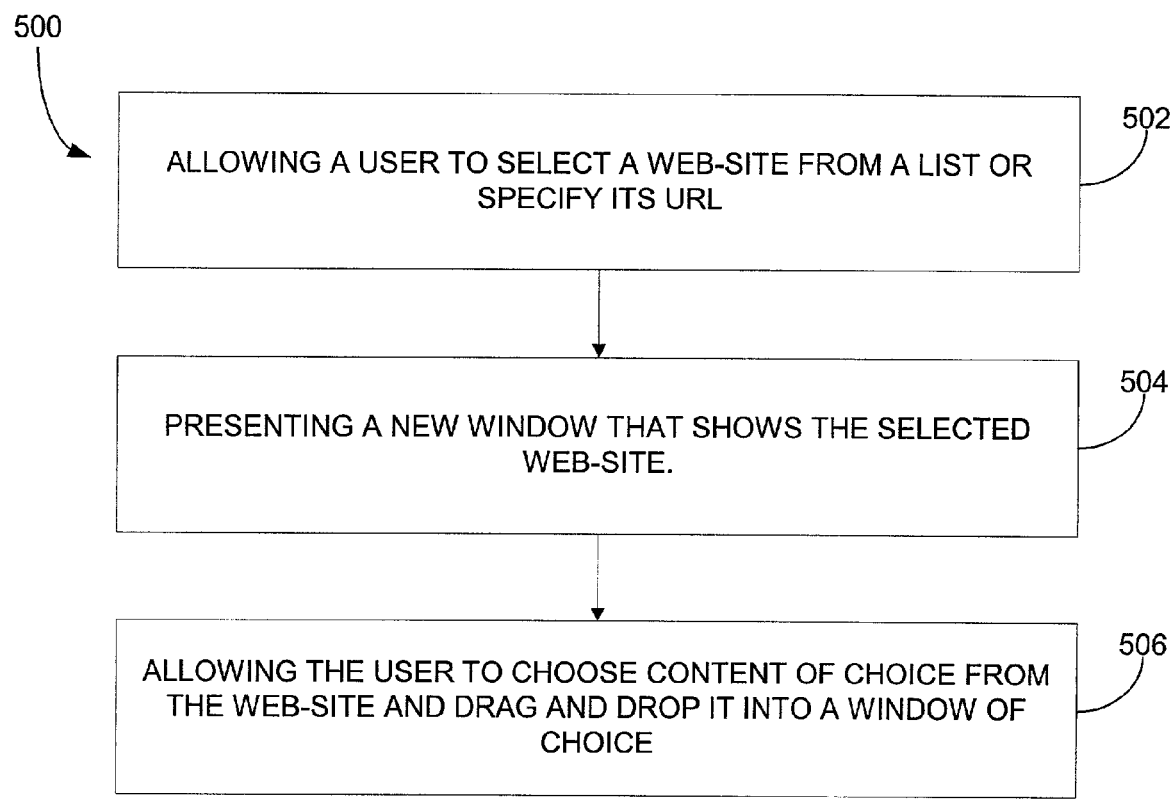
FIG. 5 is a flowchart of an advanced mode process for allowing selection and management of preferred content according to an embodiment.

FIG. 5 is a flowchart of an advanced mode process 500 for allowing selection and management of preferred content according to an embodiment of the present invention. In operation 502, a user is allowed to select a web-site from a list or specify its URL. A new window is presented in operation 504 that shows the selected web-site. In operation 506, the user is allowed to choose content of choice from the web-site and drag and drop it into a window of choice.

The mechanism for tagging selected information contained in a web-page.

Web-pages are created using HTML (Hyper Text Markup Language). The content in a web-page is formatted using a tabular format where each table is composed of individual cells distributed into a number of rows and columns. A table may contain other tables within its individual cells. The tagging of selected information within a web-page hinges upon assigning an address to each item of content within the web-page. The addressing scheme takes into account the table(s), row(s), column(s) and cell(s) an item of content belongs to. An item of content can be identified by its address within a web-page and (ii) all the addressing schemes that take into account the table(s), row(s), column(s) and cell(s) an item of content belongs to. The addressing scheme works as follows:

The page is viewed to be composed of tables that may themselves contain other tables. The tables that are not contained in any other table (highest-level tables) are assigned identifying numbers starting from 1. Tables contained within the highest-level tables are assigned numbers that take into account the tables that contain them. If a table is not contained in any other table, then it may be assigned a number, say 3. If table number 3 contains two tables, then they will be assigned numbers 3-1 and 3-2 respectively. Each table is composed of a unique number of rows and columns. Each item of content resides within a cell that belongs to a specific row and column of a table. The complete address of an item of content is then the unique identifier of the table that contains it and the position of that item of content within that table.

In addition to the address, specific information about different items of content, the attributes of the items or of their locations within the source page may also be used. For example, HTML tables have properties in terms of their headers, numbers of columns, the fonts used in various parts, border widths etc. The attributes for tables are captured in exactly the same manner as the address indicated previously. Together, address and attribute information can be used to select and mark user requested information. For example, an invariant descriptor is generated by a combination of the address and the attributes. The invariant descriptor is then stored.

Figure 6:
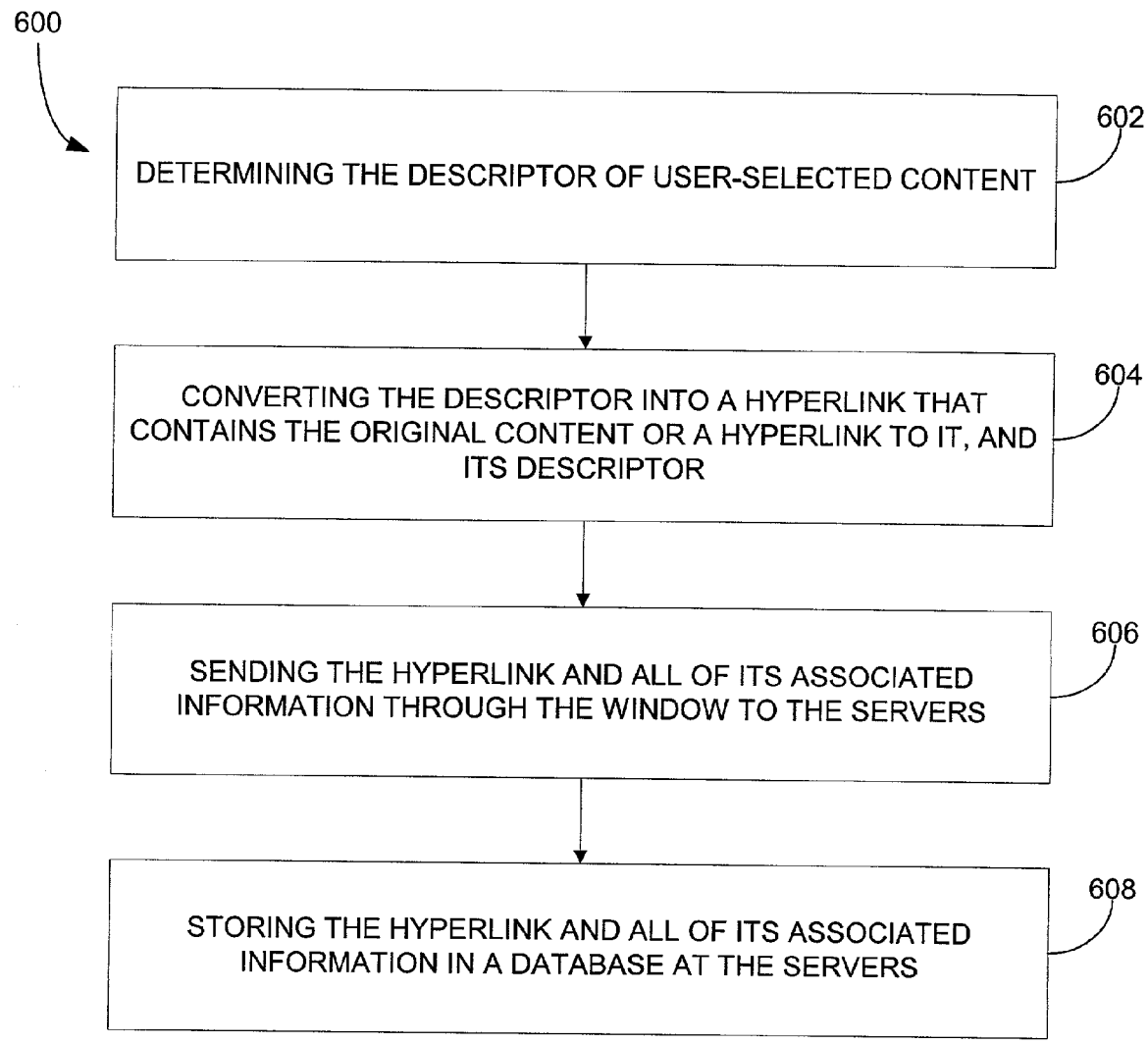
FIG. 6 is a flowchart depicting a process for tagging selected information contained in a web-page according to one embodiment of the present invention.

FIG. 6 is a flowchart depicting a process 600 for tagging selected information contained in a web-page. In operation 602, the invariant descriptor of user-selected content is determined, as set forth above. Once the invariant descriptor is determined, it is converted in operation 604 into a hyperlink that contains the original content or a hyperlink to it, and its invariant descriptor. When a user drags and drops that selected content into a window of choice, that hyperlink and all of its associated information is sent through the window to the servers in operation 606, where it is entered into a database in operation 608.

This mechanism also allows a capture of configurable sections of a web-page, including individual words, lines, paragraphs.

Figure 7:
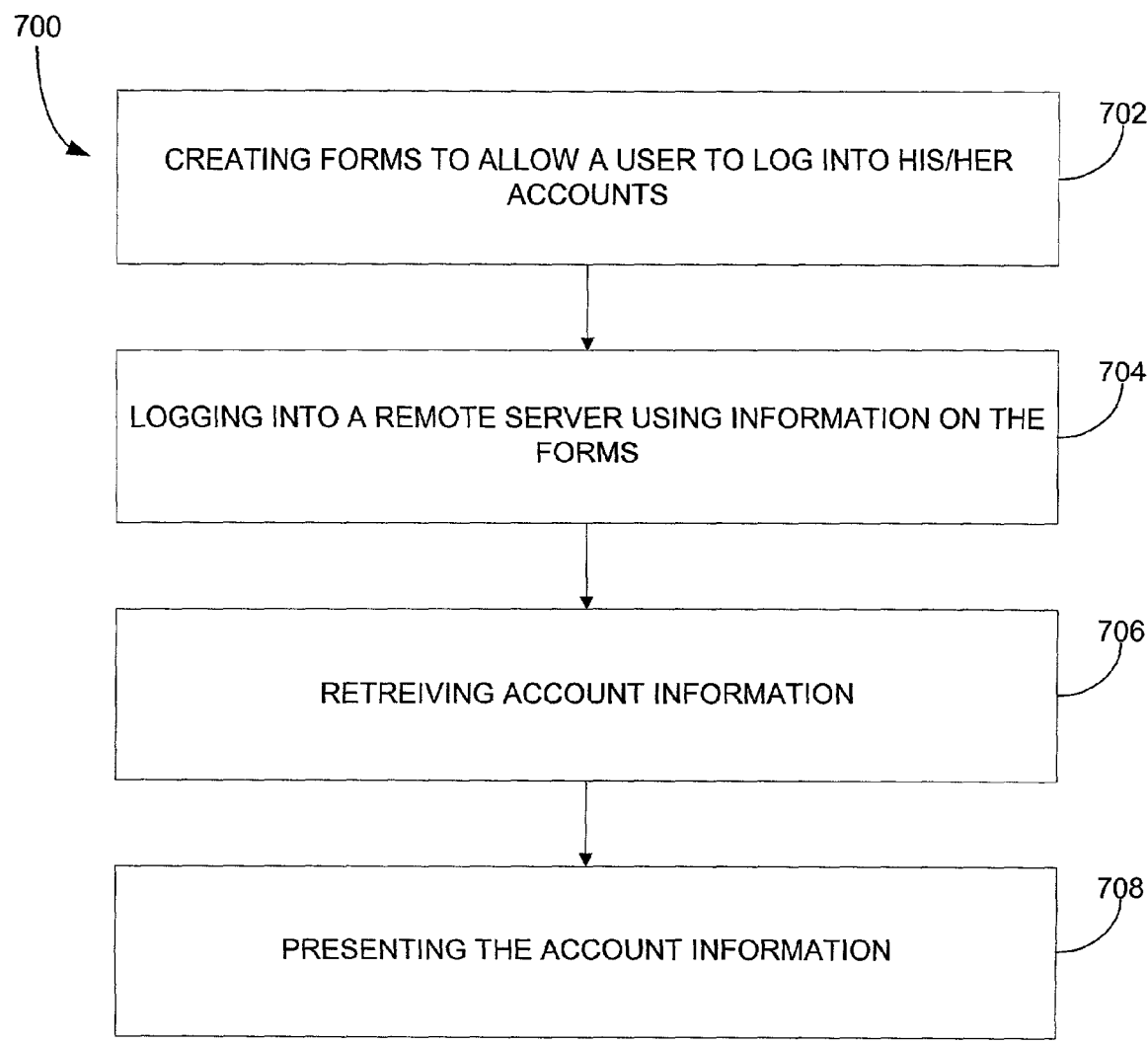
FIG. 7 is a flow diagram of a process for tagging secure information contained in a web-page.

In the case of secure information like email or bank accounts, the mechanism followed is shown in FIG. 7, which is a flow diagram of a process 700 for tagging secure information contained in a web-page. First, in operation 702, forms are created to allow a user to log into their accounts. These forms consist of (a) Dynamic information (like the user name and password) which is captured during the session (b) Static information that is required by the remote account server which is stored in a database and retrieved when an account is selected. Using the dynamic and static information, the server logs into the remote server in operation 704. The account information is retrieved in operation 706 and, in operation 708, the account information is presented in a suitable and configurable format.

The mechanism for local storage or caching of selected content.

The selected information is cached or stored locally to enable a faster access. Once a web site is selected by a user, a copy of the site, including text and images, is kept locally in the servers. When any user requests a page that has been requested before, the cached copy is presented if the content of the site has not changed since the time the page was cached. The process is broken down into two: Simple and Customized addition of content:

Addition of default content: The addition of default content proceeds as follows:
1. Once a site is selected, the backend identifies the headlines that have been pre-selected for that site.
2. The server queries the database and picks up the default headlines.
3. The headlines that are not included in the pre-selected content are not included.
4. The server contacts the ActiveX control that constitutes the administrative page and communicates the selected headlines.
5. The selected headlines are visible in the ActiveX control and are also accessible to the main user interface.

Addition of customized content: In the case of addition of customized content, the process is as follows:
1. The user selects a hyperlink by dragging and dropping them into the ActiveX control on the Administrative page.
2. The hyperlink and related information are sent to the servers. The information includes (a) the content of the link, (b) its location on the page, (c) the URL of the site, (d) the identity of the window and the view it has been dropped into and (e) the user name.
3. Once the link has been selected, it is added to the database and is accessible to the main user interface.

The mechanism for communication of selected information to the backend servers.

Once a hyperlink is dropped into a window, information is passed by the window to the backend servers. This information includes the address of the hyperlink, as defined above. In addition, the information about the window and the view containing that window is also sent to the server. This information is then used by scripts to generate the front page in HTML.

The mechanism for regular retrieval of preferred content from selected sites.

The power of the current invention is that refreshed content is retrieved from the selected sources of information as they are updated. The sources of information, or web sites, selected by users are cached locally. The web pages stored locally are categorized according to the number of times they are requested. High request sites are retrieved once every few hours, for example.

The mechanism to check for a change of content or format in the selected sources of information.

Once a page has been requested by a user, it is retrieved on a regular basis. There are two checks performed to find out a change in the information in the page. The first involves a change in the content of the page and the second a change in the format in which the content is presented.

Change in a page's content:

Every time a page is retrieved, a copy is kept locally on servers. Once a page is automatically retrieved, the content from the newly retrieved version of the page is compared to the content from a previous version of the page. If there is a change in the content, then the updated content is retrieved.

A change in the format of the content:

The formatting of the content in a page is stored in terms of a complete addressing scheme for the page, which specifies the breakdown of the page into its sub-sections. Once there is a change in the formatting of the page, then the relations of different sub-sections of the page to their parent sections change. A mechanism is implemented that keeps track of the number of differences between the format of a previously stored version of the page and the newly retrieved version. An alert is sent to the users if the number of differences is greater than a configurable number.

Sharing

Figure 8:
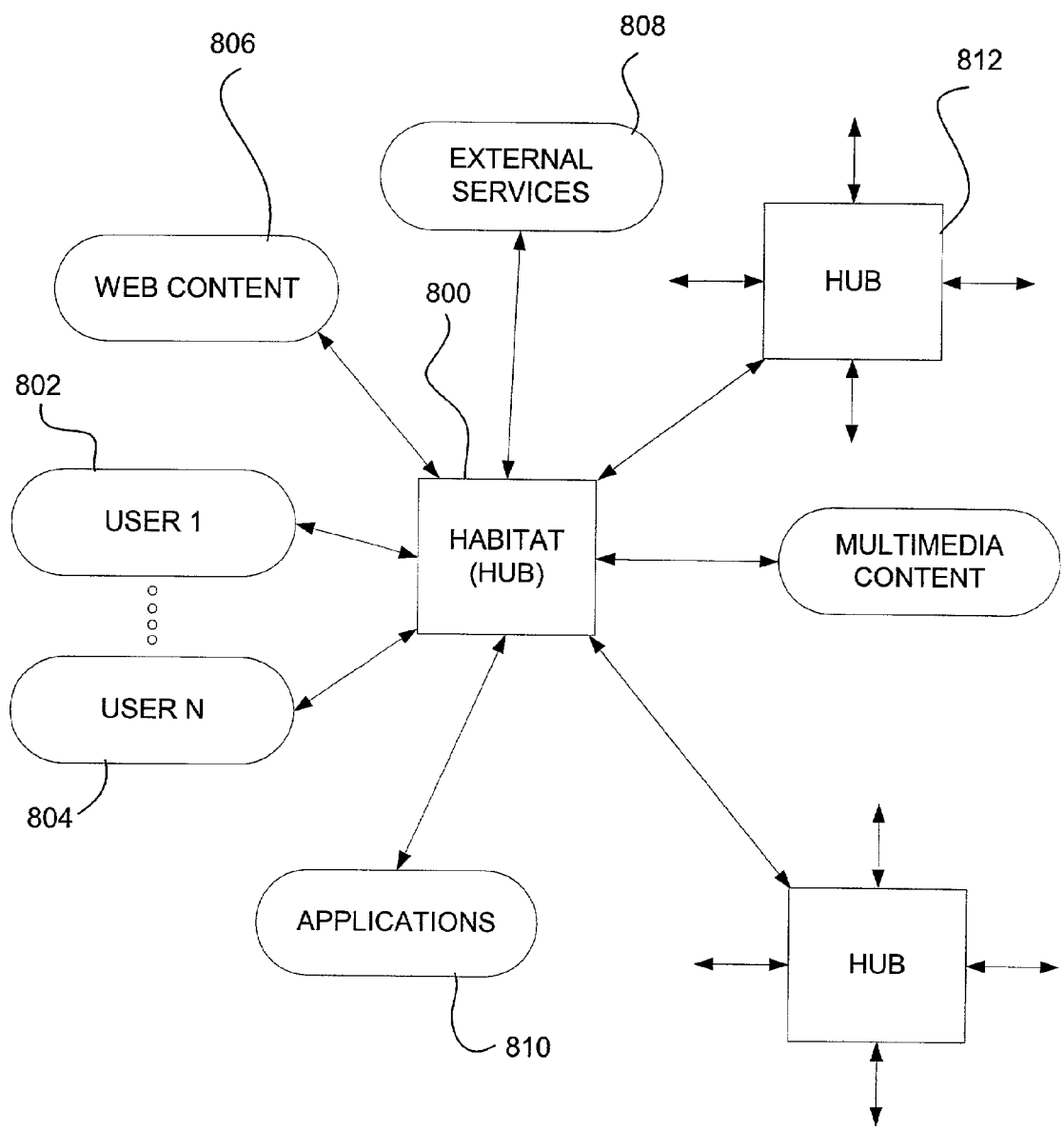
FIG. 8 depicts a habitat in communication with users, content, external services, applications, and other habitats.

FIG. 8 depicts a habitat 800 in communication with users 802, 804, content 806, external services 808, applications 810, and other habitats 812. An Internet habitat ("a habitat") according to one embodiment allows a user to create an information portal whose source and content is completely customizable. The habitat is a personalized information management system that gathers, stores and displays information of interest to the user. The selection and presentation of the information is customizable by the user. Note that several users can be allowed to customize the same habitat. The information managed in the habitat can be viewed/accessed by a client device, such as a computer, Personal Digital Assistant (PDA), web phone, wireless telephone, pager, or any other device capable of storing and/or outputting the information, whether by a direct connection or via wireless transmission.

Information on the web exists in the form of hyperlinks that appear in different web sites. A news site for example may contain headlines that are hyperlinks to their detailed exposition. In typical portals, a user chooses from a pre-determined set of headlines collected from a pre-determined set of web-sites. A user has no control over either the web-sites the user gets the content from or the headlines that are taken from those web-sites. A habitat allows a user to completely configure both the source and content that user personally desires in an information portal.

In a preferred embodiment, the habitat allows a user to create a customized portal based on an intuitive drag and drop capability. A user simply selects the sources or headlines of choice and drags and drops them into windows and views of choice. This drag and drop feature also makes customization easy for the user, allowing quick compilation and management of preferred content.

Figure 9:
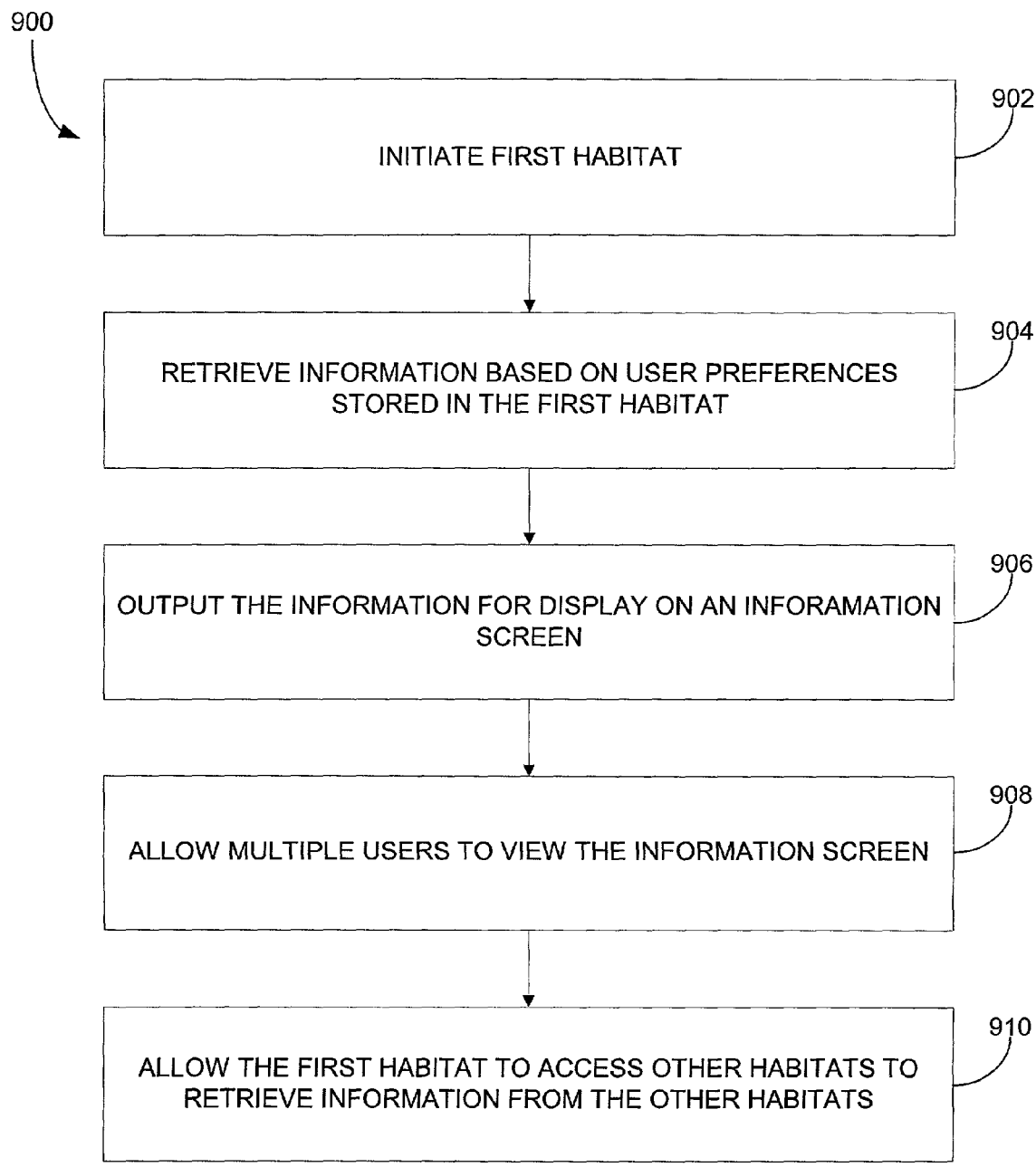
FIG. 9 depicts a process for network-based information management according to an embodiment.

FIG. 9 depicts a process 900 for network-based information management according to an embodiment of the present invention. In operation 902, a first habitat is initiated. The first habitat has markers that are utilized for identifying information selected by a user. Such information can include text, graphics, video, audio, database information, outputs of applications, or any other type of content/information. The markers can be automatically generated upon the user selecting desirable content. The markers can be pointers to the information stored locally as well as links to information stored remotely.

In operation 904, the information associated with the markers is retrieved from the data site, database, etc. and, in operation 906, displayed on an information screen (such as a web page) of the portal of the first habitat utilizing a network which is preferably the Internet. In operation 909, multiple users are allowed to view the information screen of the first habitat. Privileges for access can vary, and can be set by the user. The first habitat is allowed to access other habitats in operation 910 for retrieving information from the other habitats.

According to an embodiment of the present invention, other habitats retrieve information from the first habitat and/or other habitats. In an example of use, a first user has similar interests in investing as a second user, but the first user is not as adept at finding investment news. The habitat of the first user can automatically retrieve investment news from the habitat of the second user.

In a preferred embodiment, the first habitat selects portions of the retrieved information for display based on user-input. Continuing with the investment example, perhaps the user only wishes to review information about stocks listed on the NASDAQ Combined Composite Index and not those traded on the Dow Jones Industrials Exchange. The first habitat would then perform an analysis on the information in the second habitat either prior to or after retrieval to select only the information pertinent to the NASDAQ for display. Such analysis can include a key word search, such as a search for "NASDAQ" or the symbol of a particular stock known to be listed on the NASDAQ. Note that each of the habitats can have an assigned address such as a web address.

According to one embodiment of the present invention, a point-to-point connection between habitats can be created. Here, the first habitat connects directly to one or more habitats for selecting and retrieving the information from the habitat(s).

A peer to peer model for habitat-to-habitat information retrieval can also be provided. In this model, the first habitat sends out a request for desired information to a plurality of habitats and retrieves the desired information from one or more of the habitats that respond to the request preferably via a point-to-point connection.

According to another embodiment of the present invention, the first habitat is in communication with a plurality of habitats such that a sub-network of habitats is formed. This enables such things as real-time updates of the various habitats when content changes in one of the habitats. Also, a user viewing the information of the first habitat can "jump" to one of the other habitats to view the information available there.

According to yet another embodiment of the present invention, application-habitat communication is enabled. Thus, an application can communicate with the first habitat for retrieving information from the first habitat. Further, the first habitat can interact with the application for performing tasks such as presenting output of the application, for example.

Figure 10:
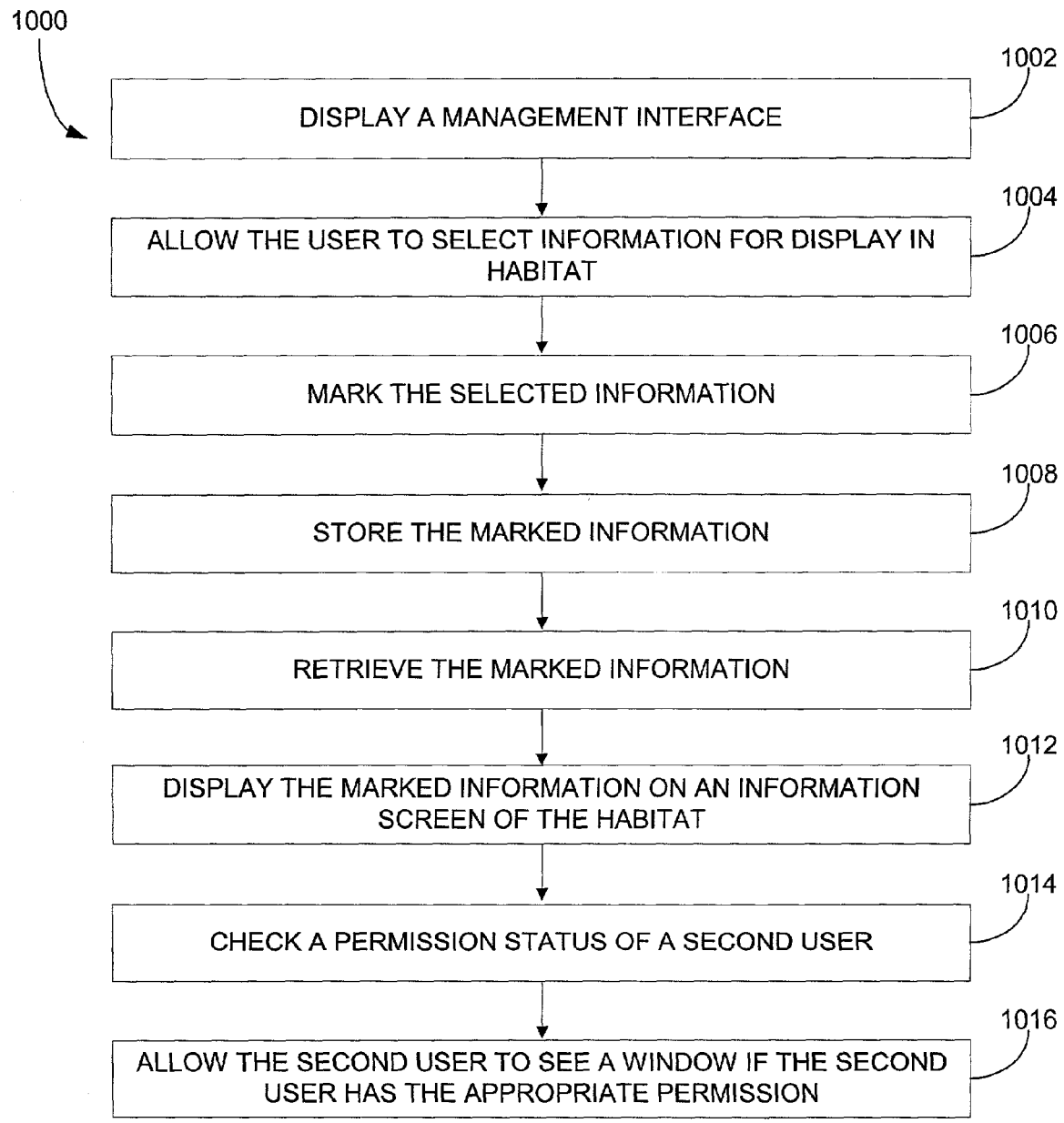
FIG. 10 is a flowchart of a process for generating a user-sharable network user interface.

FIG. 10 is a flowchart of a process 1000 for generating a user-sharable network user interface. A management interface is displayed in operation 1002. The management interface allows a user to select and manage information displayed on an information screen of a habitat, where the management interface includes information of one or more content sources. In operation 1004, the user is allowed to select portions of the information available in the content sources. The selected information of the content source is marked in operation 1006 and stored in operation 1008. When the user wants to view the information he or she has selected, the marked information is retrieved in operation 1010 and displayed on the habitat information screen in operation 1012. The information screen includes at least one view. Each view contains at least one window for displaying the marked information. A permission status of a second user is checked in operation 1014 to determine whether the second user is authorized to see a window. In operation 1016, the second user is allowed to see the window of the information screen of the first user if the second user is authorized.

The first user may set permissions for allowing other users to view view(s) and/or window(s), at the first user's option. As an option, the second user can add or remove content from the window. Preferably, a notice saying the window is shared is sent to the second user.

For example, if a user wants to share all six windows with another person, the user sets his or her habitat to share the view. An announcement is sent to the other person saying that the user wants to share a view or window with the other person. The other person can preview the view. If he likes it, he can accept the invitation and view the window or view. If not, he can decline.

A user can also only allow access to certain windows. Further, privileges granted to other people to add and remove content from the user's habitat can be set. The habitat can be made read-only. Or another user may not be allowed to be see it at all.

The habitat can be shared on a group basis. For example, an invitation can be sent to an entire product group. Each person in the group can accept or decline the invitation.

The process of FIG. 10 is superior to prior art methods of collaboration. First, the changes in the habitat views and windows are interactive. Second, the habitats are saved, so collaboration continues for as long as the user wants. Finally, the fine-grain control afforded to the user to control who sees what is highly distinguishable from known systems, as such systems make users share everything.

A customizable information retrieval engine has thus been described that allows users to aggregate content of their choice from any web-site in existence and share that content with others. The content may include, but is not restricted to: text (i.e. news headlines, hyperlinks in web-pages), secure account information (i.e. email, bank accounts, utilities, and stock portfolios), services (i.e. maps, directions, weather, web searches), financial transactions (i.e. online shopping, buying, selling, trading, auctions, barters, comparisons) and other dynamic tasks that involve interaction of the users with other web-based (client and server side) services. The aggregated content may be displayed in a customized web-based habitat, which is amenable to presentation and content customization through an intuitive interface.

Enterprise Habitat

The Enterprise Habitat Environment

The Enterprise Habitat (EH) is organized with a series of views, windows, and categories. Windows and views are containers for holding and organizing content, while categories allow a user to organize content within each window. The EH allows a user to organize content in virtually unlimited ways.

The following discussion makes several references to exemplary user interfaces which are not shown as the description is deemed self-explanatory to one skilled in the art. One skilled in the art will understand how each menu item, button, command, etc. can be used in a MICROSOFT® Windows-type environment to replicate the teachings provided herein. Menu items, buttons, etc. are in bold type.

Views

Figure 11:
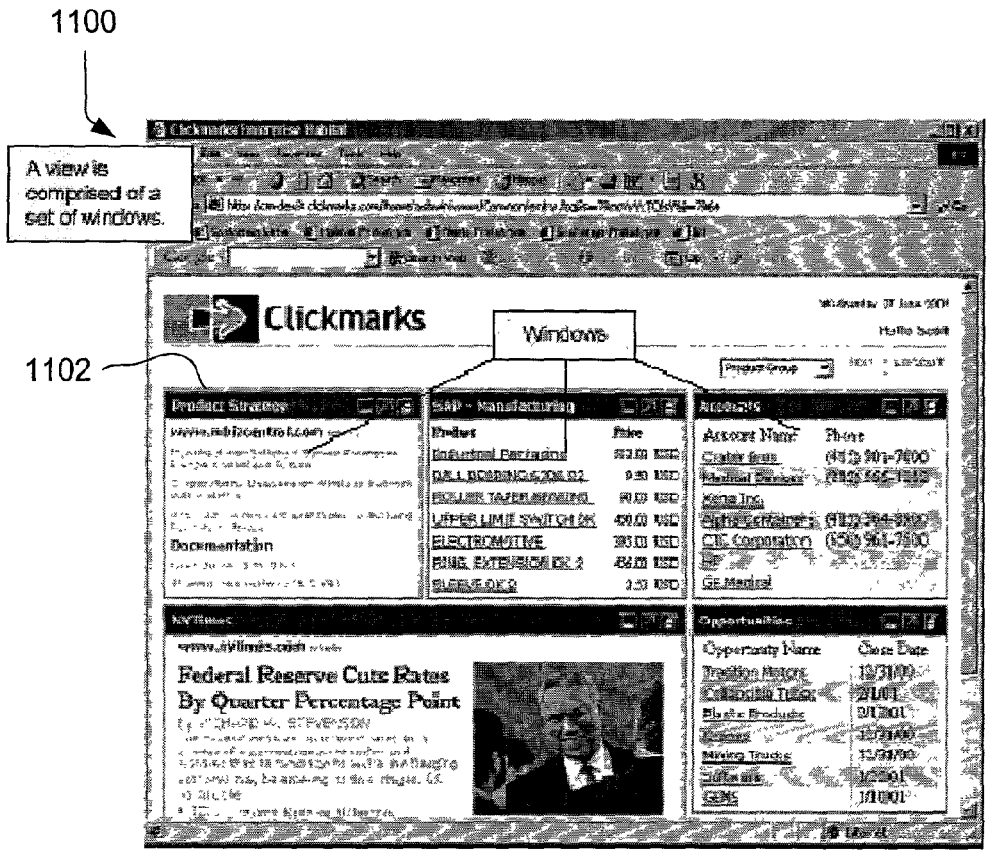
FIG. 11 illustrates a view in a habitat according to one embodiment.

FIG. 11 illustrates a view 1100 according to one embodiment. Views are the highest level of content organization in the EH. There is no limit to the number of views a user can create to customize how to see, hear, and interact with content. Each view is divided into sub-sections called windows 1102. The default Main View is the EH Home page.

Windows

Windows are contained within views. A window typically holds content from either a single source (such as a single Web site or a single document) or multiple sources that are related (such as news headlines or sales statistics). A view can accommodate several windows. The user can rearrange windows by dragging the window title bar to a new location in a view.

Figure 12:
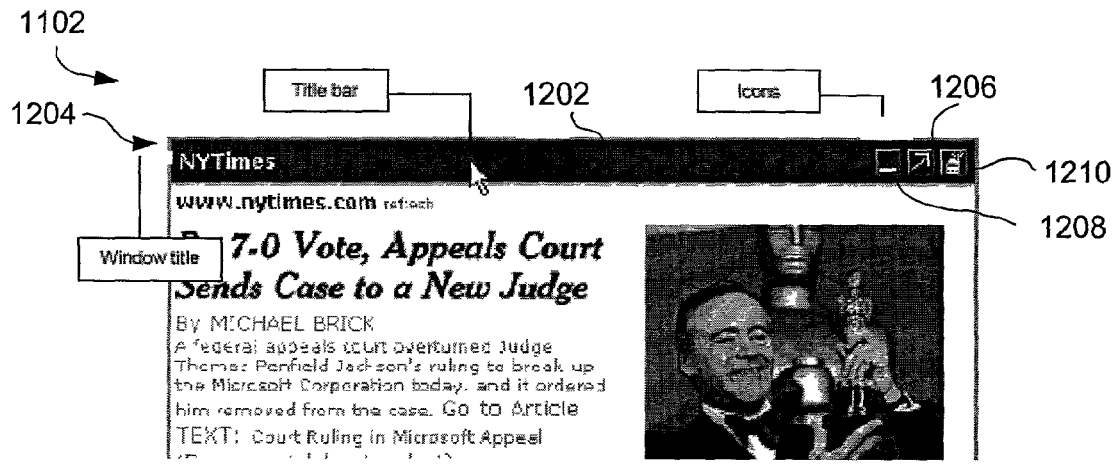
FIG. 12 shows an illustrative window in an Enterprise Habitat (EH).

FIG. 12 shows an illustrative window 1102. Each window has a title bar 1202, which contains the window title 1204 and icons for:

- Expand/Contract 1206—Expand widens the window to the full width of the current view, moving neighboring windows to a temporary row below. Contract reduces the window to its original size.
- Minimize/Maximize 1208—Minimize closes the body of the window, leaving only the title bar. Maximize enlarges the window to its full size.
- Wireless 1210—Wireless indicates whether the window is available from a wireless device. When the icon is the window title color, the window is visible; when it is red, the window is hidden. By default all windows are wireless enabled. For more information, see Using EH on a PDA, or Using EH on a Phone (below).

Categories

Within each window, a user can create categories to further sub-divide content. Categories are denoted in bold text to define the content below them.

View Toggle

Figure 13:
FIG. 13 depicts a View Toggle dropdown menu in an EH.

Upon initial launch of the EH, the Main View contains three items: the Main Window, the name of the current view, and a link to the Edit View. When additional views are created, they are listed in the View Toggle dropdown menu 1300. See FIG. 13. To switch from one view to another, click the dropdown menu and select the desired view. The Edit View also contains the View Toggle so that the user can easily change to a different view.

Edit View

Figure 14:
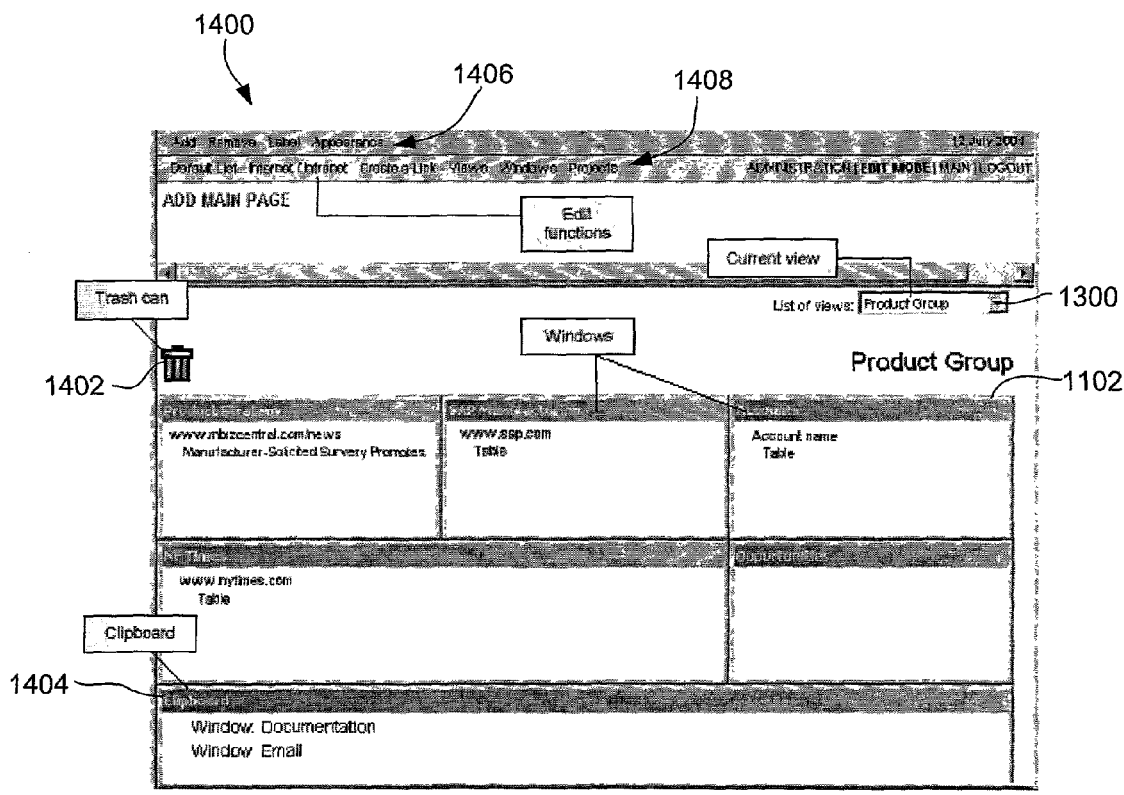
FIG. 14 depicts an edit view of the EH.

FIG. 14 depicts an edit view 1400 of the EH. The Edit View is used to build and edit the Main View as well as to create additional views. The Edit View allows a user to perform tasks such as adding and removing views and windows, renaming views and windows 1102, changing the layout of windows, creating and managing projects, and changing passwords.

To open the Edit View, click Edit on the top, right-hand side of the view to be edited. The Edit View contains the View Toggle 1300, which displays the current view. The user can switch between views and edit the windows or content for that view.

Windows, content, and other elements can be deleted by dragging them to the trash icon 1402. The Edit View also contains the Clipboard 1404 where additional windows or content is temporarily stored.

In the Edit View, several functions 1406 are provided, and which are described below. When different functions are selected, the list of options 1408 changes. illustrative functions include:

Add
Remove
Label
Appearance
Help

Clipboard 1404

The Clipboard serves as a holding or storage space for additional windows, application interfaces or content. The user can add content to the Clipboard just as content is added to any window. The user can also drag content from a window to the Clipboard. The content remains on the Clipboard as the user toggles through the views allowing the user to move content between views.

Windows can be dragged to the Clipboard to temporarily store them or to move them to another view. If windows are added to a view when the view is full (it has X number of windows), the windows are placed on the Clipboard. The user can move windows to or from the Clipboard to arrange them in any order desired.

Customizing the EH

There are many ways that a user can customize the EH to match the user's preferences. The user can add an unlimited number of views with customized windows where the user can define content. The user can also change the way the EH looks by altering the font size and color, and sizing windows to user preferences.

The EH can be customized from any device that accesses the habitat. For example, the customization tools can be displayed on a workstation, a PDA, a wireless telephone, a handheld computer such as a handheld PC or a Blackberry-type device, a pager etc.

Figure 15:
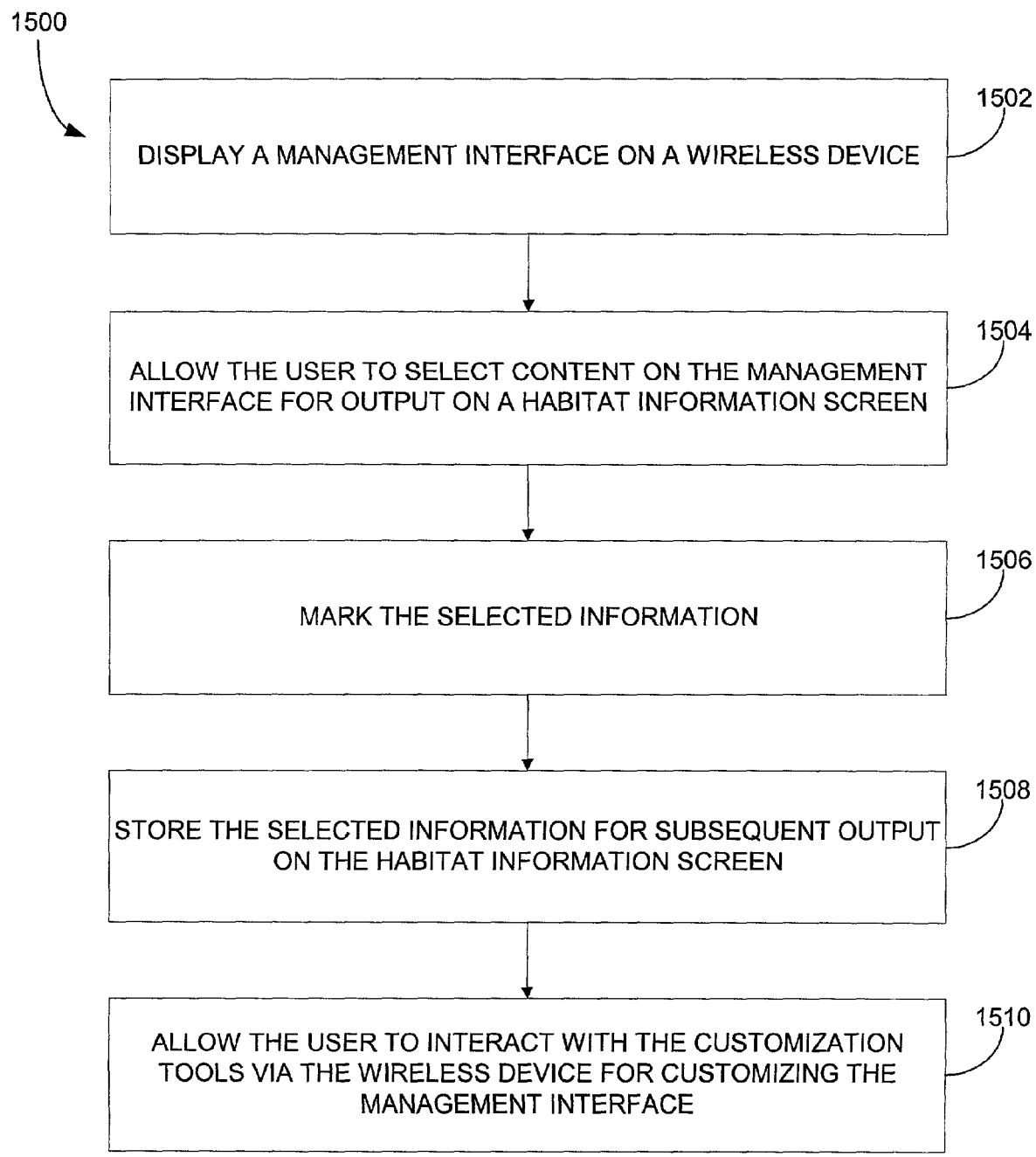
FIG. 15 is a flow diagram of a process for customizing a network user interface.

FIG. 15 is a flow diagram of a process 1500 for customizing a network user interface of a habitat. A management interface is displayed on a wireless device in operation 1502. The management interface allows a user to select and manage information displayed on a habitat information screen. The management interface includes information of one or more content sources and customization tools. In operation 1504, the user is allowed to select portions of the information available in the content source(s). The selected information of the content source(s) is marked in operation 1506 and stored for subsequent output on the information screen in operation 1508. In operation 1510, the user is allowed to interact with the customization tools via the wireless device for customizing the management interface. See also the section below entitled Using EH on a Phone.

Adding Views

Use the View function to add new views in addition to the default Main View. The user can create an unlimited number of views.

To Add a New View:
1. From the view, click Edit.
2. Click Add.
3. Click Views.
4. Type the name for the new view.
5. Choose from one of the predefined view layouts or customize the view layout according to preference.
    To use a predefined layout, click one of the layout choices.
    To customize the layout, select the number of rows for the view.
6. Click Done. The view is added with one empty window.

The new view appears in the Edit View as well as in the View Toggle dropdown menu. Switch between different views using the View Toggle dropdown menu.

Adding Rows to Views

Views can contain a predefined number of rows with one or more windows in each row. To add a row to a view:
1. From the view, click Edit.
2. Click Appearance.
3. Select the number of rows to be added.
4. Click Done.

Adding Windows

Use the Window function to add a new window within a specified row in a view. A maximum number of windows per row can be specified. If a row is full, a new row can be added to accommodate the additional window. For details, see Adding Rows to Views (above).

If a window is not named when created, EH provides a default name of Window 1. Subsequent windows are named sequentially (i.e. Window 3, then Window 4). To rename a window, see Renaming Windows, Views, and Content. To add a new window:
1. From the view, click Edit.
2. Click Add.
3. Click Windows.
4. Type the name of the new window.
5. Using the dropdown menu, select the row in which to place the new window.
6. Click Done.

Creating Categories

This function allows a user to personalize the EH by adding new categories to organize content within a window. The user can add an unlimited number of categories. To create new categories:
1. From the view, click Edit.
2. Click Label.
3. Click Create New Categories.
4. Type the name of the new category.
5. Click Done.
6. Drag-and-drop the new category into the desired location in the selected window.

Renaming Views, Windows, and Categories

Preferably, a user cannot rename windows or content from windows created by the company; moreover, the user preferably cannot rename the default Main View. To rename views, windows, and categories:
1. Right-click on the view title, window title, or category title and select Rename.
2. Type the new name.
3. Click OK.

Deleting Views, Windows, and Categories

Preferably, only the user can remove the views or windows that the user created. In some cases, the user may not be allowed to remove content from a view or window created by the company. There are two ways to delete views, windows, and categories:
Drag-and-drop the view title, window title, or category title into the trash can
Right-click on the view title, window title, or category title and select Delete Adjusting Window and View Layout The number of rows and the number of windows in a view can be changed. Any window that does not fit into the new view is placed on the Clipboard. If a layout with a fewer number of windows than the current layout is chosen, windows starting at the top left corner of the previous layout are moved to the new layout, from left to right, top to bottom. Positioning priority can be given to windows created by the company. If a layout with more than the previous number of windows is chosen, the left to right, top to bottom placement appears with extra windows placed on the Clipboard.

To change the window and view layout:
1. From the view, click Edit.
2. Click Appearance.
3. Click Adjust.
4. Choose from one of the predefined view layouts or customize the view layout according to user preferences.
   1. To use a predefined layout, click one of the layout choices.
   2. To customize the layout, select the number of rows for the view. Then, select the number of windows for each row.
5. Click Done.

Resizing Windows

Use the Resize Windows function to increase or decrease the size of any window in the EH. A window can be resized so that it spans the width of an entire row or just a fraction of it.

Changing Fonts

The font type and size for the display can be changed. This change can be set to affect every view and window in the EH.

Changing Colors

Use the Colors function to change the color of window titles, text, and other visual elements of views.

User Profile

User profile information is used to facilitate the checkout process when content from the Default List is used to make an online purchase. It contains personal information such as a shipping and billing address, and credit card information. Once a user enters this information, the user can easily access it when he or she is making an online purchase so the user does not have to manually enter address or credit card information each time. The user can have as many shipping, billing, and credit card profiles as desired. For example, a user might have one shipping address for work, one for home, and one for a family member. The user can track several credit cards and can choose the appropriate one when needed. The profile is accessible through the Edit View.

Managing Content

EH allows the addition of many types of content including Internet or Intranet content, accounts, services, and files. Content can be pre-selected by the company and placed in designated views and windows. In many cases, the user cannot remove this content.

When adding content from the Internet or Intranet, there are many choices for obtaining and formatting the content. The following description describes how to capture content as well as how to update or delete it. Note that the following description applies to wireless devices as well as devices with a physical network connection.

Adding Pre-loaded Content

Figure 16:
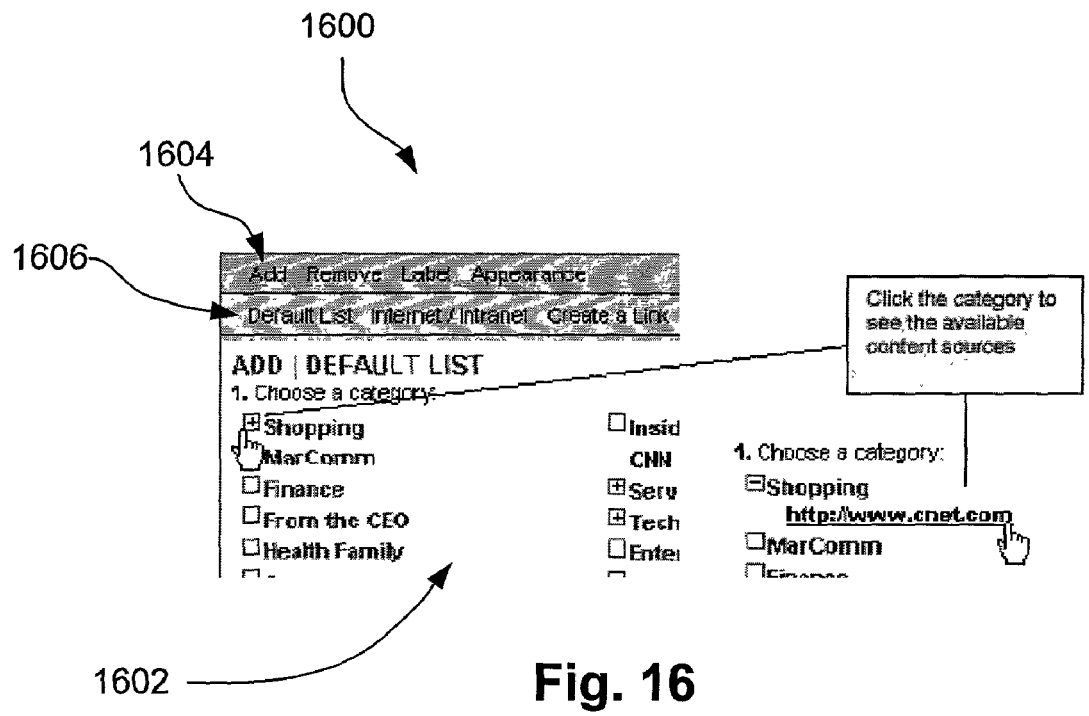
FIG. 16 is a drawing of a screen having a list of categories that can be added to the EH.

Use the Default List to add Internet or Intranet-based content or applications pre-selected by a manager or the company's Webmaster. FIG. 16 is a drawing of a screen 1600 having a list of categories 1602. To add content from the Default List:
1. From the view, click Edit.
2. Click Add 1604.
3. Click Default List 1606 to open the list of categories containing pre-selected content. Categories containing pre-selected content are marked by a plus (+) icon. Click the category to see the available content sources.
4. Click the plus (+) icon next to a category to see the list of pre-selected content sources.
5. Click the content source and drag it into an available window.

Some accounts and services such as email accounts and query systems may require additional information after the user drags-and-drops the source. EH prompts the user for the additional information. After completing the additional information, the window is loaded with the desired account or service.

Setting up Email

One of the features of EH allows access to Outlook, Post Office Protocol (POP3), or Internet Message Access Protocol (IMAP) email through the EH, and on the wireless device. To set up email:
1. From the view, click Edit.
2. Click Add.
3. Click Default List.
4. Click the plus (+) icon next to Email or Outlook.
5. Click the desired content source such as Pop3 Mail or Outlook Mail, and drag it into an available window.
6. Complete the email account information:
    Username: The user name for this account
    Password: The password for this account
    Server name: The email server name, for example, myserver.clickmarks.com
    Email: The user's email address, for example, jdoe@clickmarks.com
    Alias: (Outlook only) The user's alias name, which is set up by the system administrator.
7. Click Submit.
8. Click Main to view email.

Adding Internet/Intranet Content

Use the Internet/Intranet function to add a page or a portion of a page from the Internet or the company's Intranet to the EH. When Web content is added, several options are presented for gathering the content:
    Links and Images
    Highlight a Table
    Highlight a Form
See the following sections for instructions on how to add each option.

Adding Web Page Links and Images

The user can add any link or image from a Web page to the windows. After adding the link, it displays in the view allowing the user to open it without going to the Web page. To add a link or image:
1. From the view, click Edit.
2. Click Add.
3. Click Internet/Intranet.
4. Type the Web site address and click Enter. The Web page displays in the top panel.
5. Drag the link or image to the desired window.

Adding Web Page Tables

Figure 17:
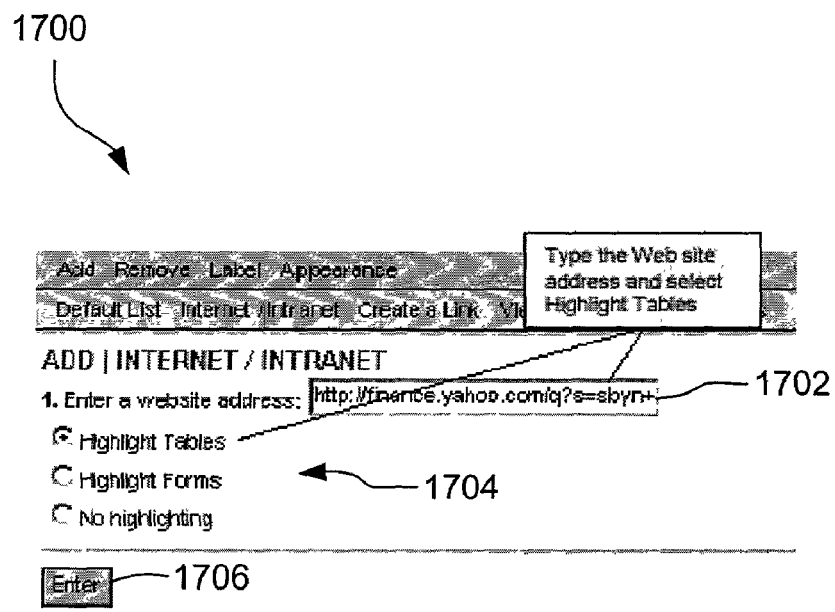
FIG. 17 is a drawing of a screen used for adding web page tables to the EH.
Figure 18:
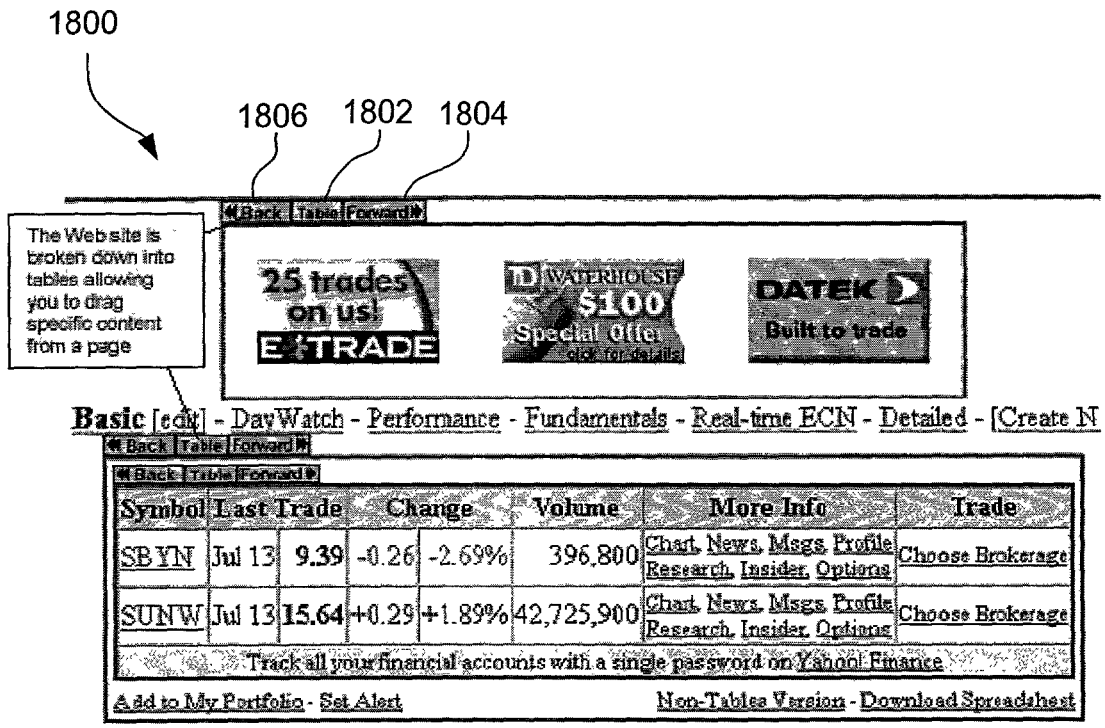
FIG. 18 is a screen that shows the Web page broken downs into tables.
Figure 19:
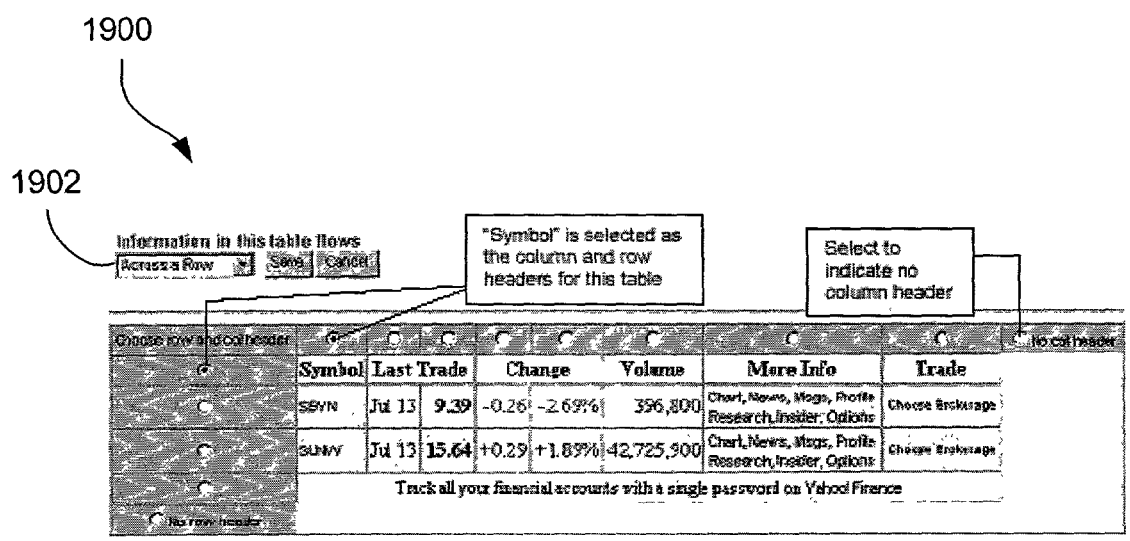
FIG. 19 illustrates an exemplary screen allowing selection of headers for a table added to the EH.

Web pages generally are organized using tables. The Highlight a Table feature allows the user to see the tables that are otherwise hidden, and add them to the EH. This feature is used to get specific information from a page when the entire Web page is not desired. To add a table:
1. From the view, click Edit.
2. Click Add.
3. Click Internet/Intranet. The screen 1700 of FIG. 17 is displayed.
4. Type the Web site address in the address field 1702.
5. Select Highlight Tables 1704 and click Enter 1706. The Web page loads in the top panel with a red border surrounding and a tab attached to each table within the page. FIG. 18 is a screen 1800 that shows the Web page broken downs into tables.
6. Drag the Table tab 1802 to the desired location in the desired window. The user can also click the Table tab to select a specific row or cell in the table. Use the Back and Forward tabs 1804, 1806 to display or hide the rows and cells. The Set Table Headers dialogue box appears, asking for customization of the display of the table and to name row and/or column headers.
7. FIG. 19 illustrates an exemplary screen 1900 allowing selection of headers, for example, Symbol, Last Trade, and Change. Choose the way in which the information flows—Across a Row or Down a Column—from the flow selection menu 1902.
8. Select the row header and the column header if the table has headers to label information categories (in many cases, headers may not be needed at all).
9. Click Done. The table is placed in the window. (Click Main to see the table in the view.)

Adding Web Page Forms

Some Web pages and Web-based applications use forms to gather information from the user or to provide search functions. The Get a Form feature allows the user to capture a specific form (such as a database query or a search engine) and place it in the EH. For example, the user can add a form from a Web site that provides a search function for finding businesses in the yellow pages. To add a Web page form:
1. From the view, click Edit.
2. Click Add.
3. Click Internet/Intranet.
4. Type the Web site address.
5. Select Highlight a Form and click Enter. As shown in FIG. 20, the Web page 2000 loads in the top panel with a green border surrounding and a tab attached to each table within the page.
6. Drag the Form tab 2002 to the desired location in the desired window. (Click Main to see the form in the view.)

Creating Document Links

The Document Link feature can be used to upload a file from a computer or Network. When the link in the view is selected, Web sites and documents viewable in a browser open in a new browser window; otherwise they open in the application in which they were created (such as MICROSOFT® Excel or Word). To create document links:
1. From the view, click Edit.
2. Click Add.
3. Click Document Link.
4. Type the file location from which to upload the file. The user can also browse to the file location.
5. Type a name for the new link.
6. Click Done.
7. Drag the link to the desired location in the desired window.

Renaming Content

The user may or may not be allowed to rename windows or content from windows created by the company. To rename content:
1. Right-click on the view title or window title and select Rename.
2. Type the new name.
3. Click OK.

Deleting Content

Preferably, only the user can remove the content that the user created. In some cases, content cannot be removed from a view or window created by the company. Two ways in which to delete content are:

Drag-and-drop it into the trash can

Right-click on the content item and select Delete.

Adding Pattern

Figure 21:
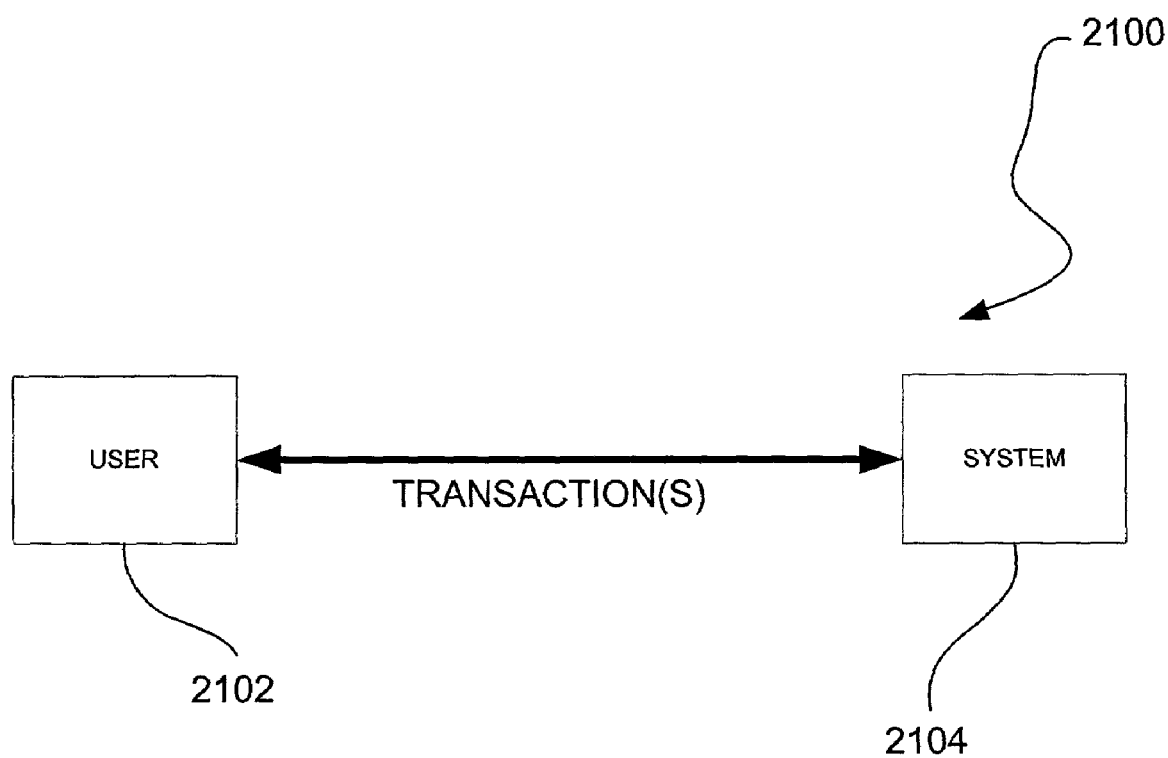
FIG. 21 illustrates a system including a user and a system, in accordance with one embodiment.

FIG. 21 illustrates a system 2100 including a user 2102 and a system 2104, in accordance with one embodiment. During use, the user and the system interact during transactions. According to one embodiment, a transaction refers to communicating (i) information and/or actions required to conduct the transaction, and/or (ii) information and/or actions sent back or desired by the user, respectively.

For example, a transaction, in one embodiment, may refer to: information submitted by the user, actions taken by the user, actions taken by a system enabling the access of the user to the data, actions taken by the data to retrieve/modify content, results sent back to the user, and/or any combination or portion of the foregoing entities.

Figure 22:
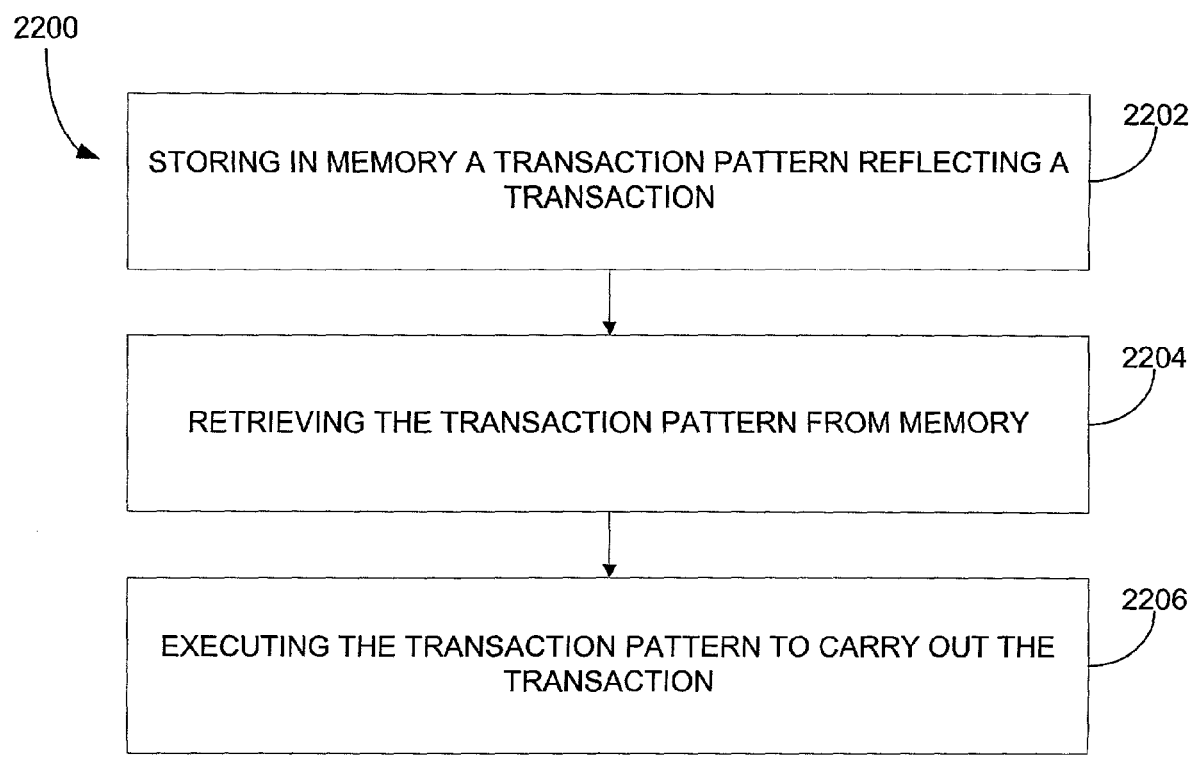
FIG. 22 illustrates a method for carrying out a computer-implemented transaction.

FIG. 22 illustrates a method 2200 for carrying out a computer-implemented transaction. Initially, in operation 2202 a transaction pattern reflecting a transaction is stored in memory. This may be carried out while the transaction is happening.

In one embodiment of the present invention, the transaction pattern may include a record of: information submitted by a user, actions taken by the user, actions taken by a system to generate results, and results sent to the user. As an option, the transaction pattern may include a record of actions taken by the system which enable access of the user to data, and actions enabled by the data to retrieve content. Storage in accordance with operation 2202 may take any form with sufficient identification and description of any required step in the transaction process.

Figure 23:
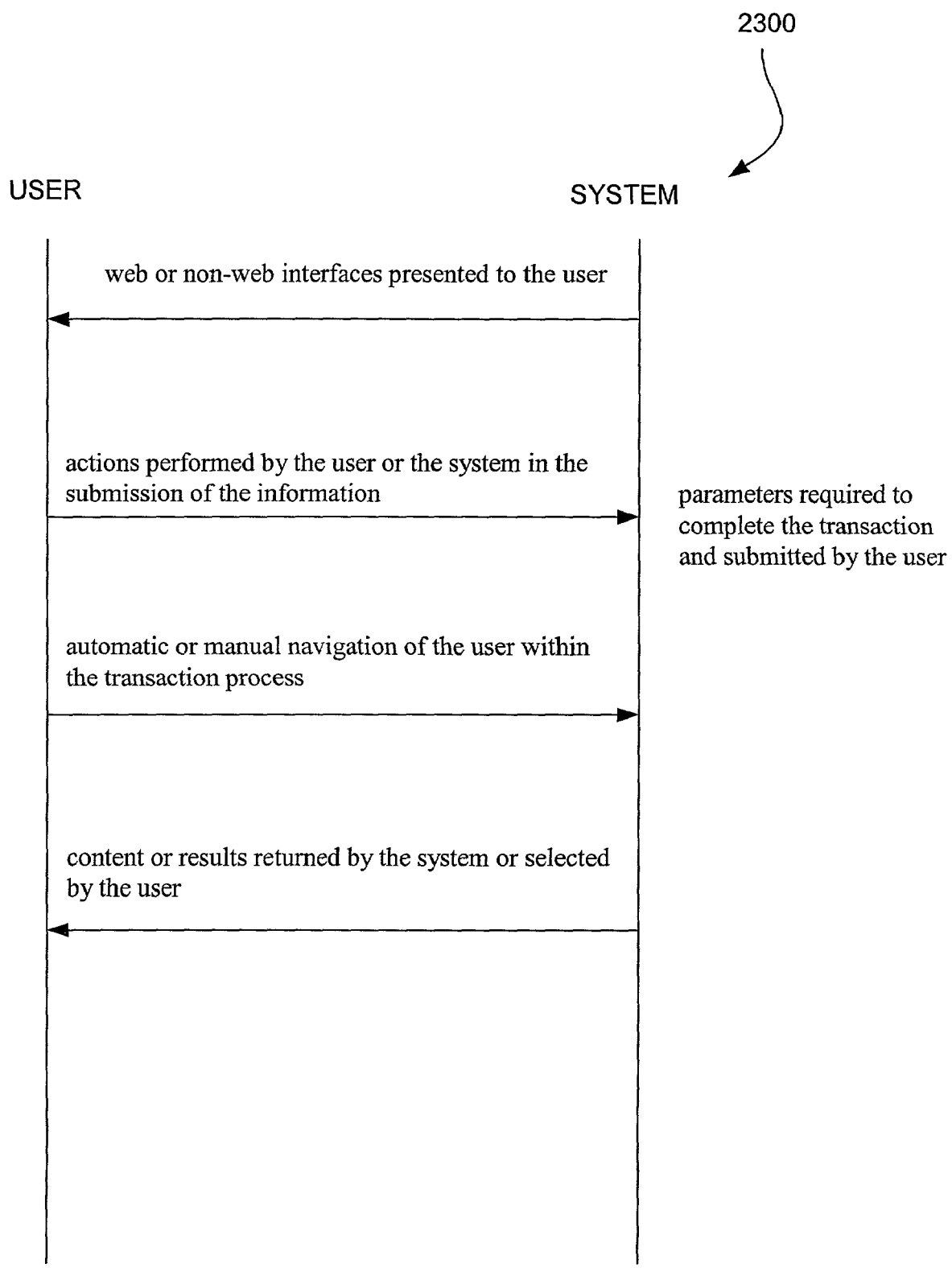
FIG. 23 illustrates an exemplary flow diagram illustrating the various information which may be stored during operation 2202 of FIG. 22.

FIG. 23 illustrates an exemplary flow diagram 2300 illustrating the various information which may be stored during operation 2202 of FIG. 22. For example, such information may involve (i) the web or non-web interfaces presented to the user, (ii) the actions performed by the user or the system in the submission of the information, (iii) the parameters required to complete the transaction and submitted by the user, (iv) the automatic or manual navigation of the user within the transaction process, and/or (v) the content or results returned by the system or selected by the user.

With continued reference to FIG. 22, during use of the present invention, such transaction pattern may be retrieved from memory when desired in operation 2204. Thereafter, the transaction pattern is executed to carry out the transaction in an automated manner. Note operation 2206. An execution, or playback, in accordance with operation 2206 may include the invocation of a stored transaction pattern.

Figure 24:
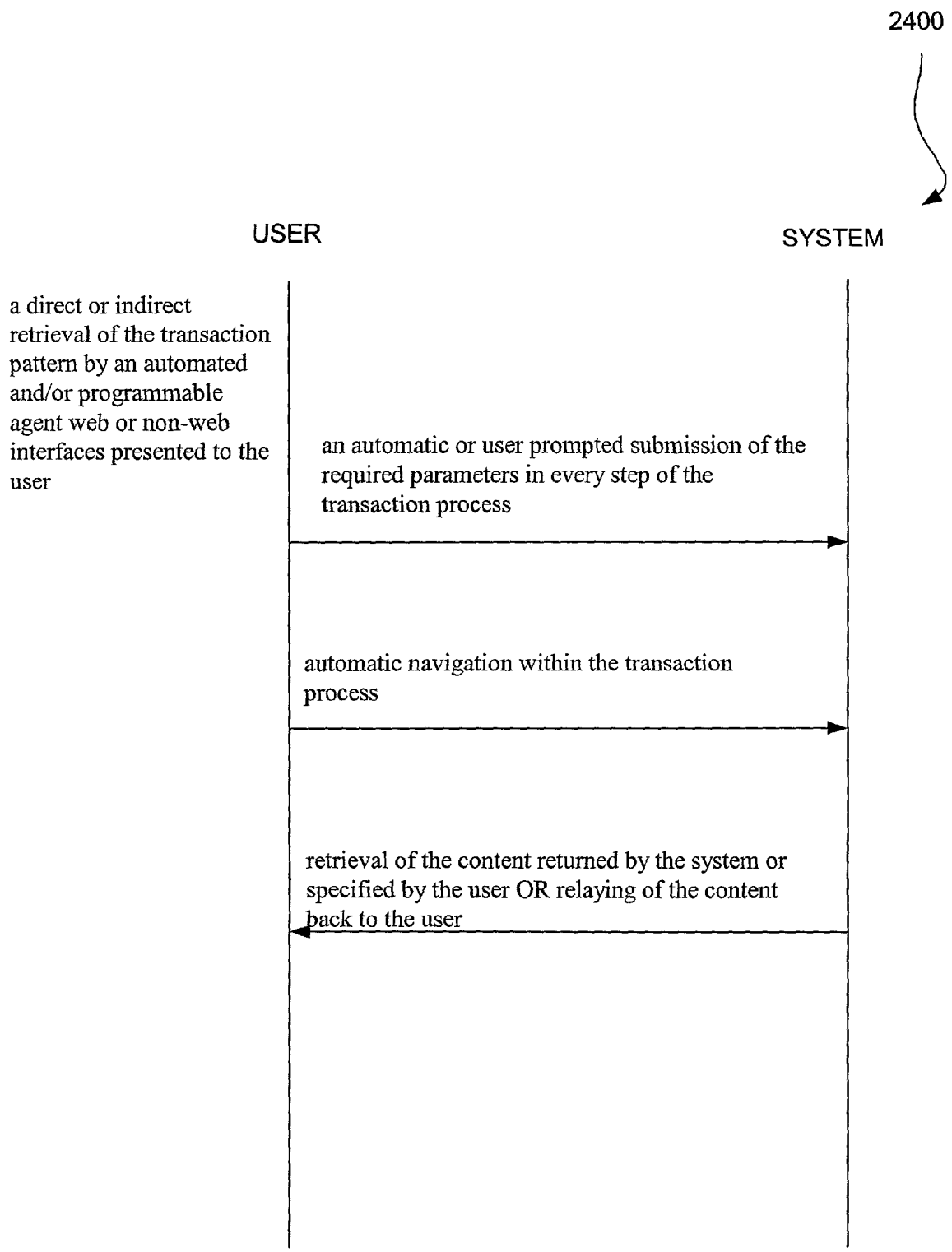
FIG. 24 illustrates an exemplary flow diagram illustrating the various operations that may occur during execution of a transaction pattern in accordance with operation 2206 of FIG. 22.

FIG. 24 illustrates an exemplary flow diagram 2400 illustrating the various operations that may occur during execution of a transaction pattern in accordance with operation 2206 of FIG. 22. Such may involve: (i) a direct or indirect retrieval of the transaction pattern by an automated and/or programmable agent, i.e. a computer server/client, an active or dormant program, a human being, etc. (ii) an automatic or user prompted submission of the required parameters in every step of the transaction process, (iii) the automatic navigation within the transaction process, (iv) a retrieval of the content returned by the system or specified by the user, and/or (v) the relaying of the content back to the user.

A transaction pattern for any transaction need only be recorded once by anyone with sufficient system access privilege. Once recorded, any user may conduct that transaction, any number of times, by the invocation of the recorded transaction pattern, or "transaction macro."

Since a transaction macro can be stored in any fashion and invoked, directly or indirectly, by any agent (human or automated), it enables the completion of the transaction it describes in any fashion from any device.

Figure 25:
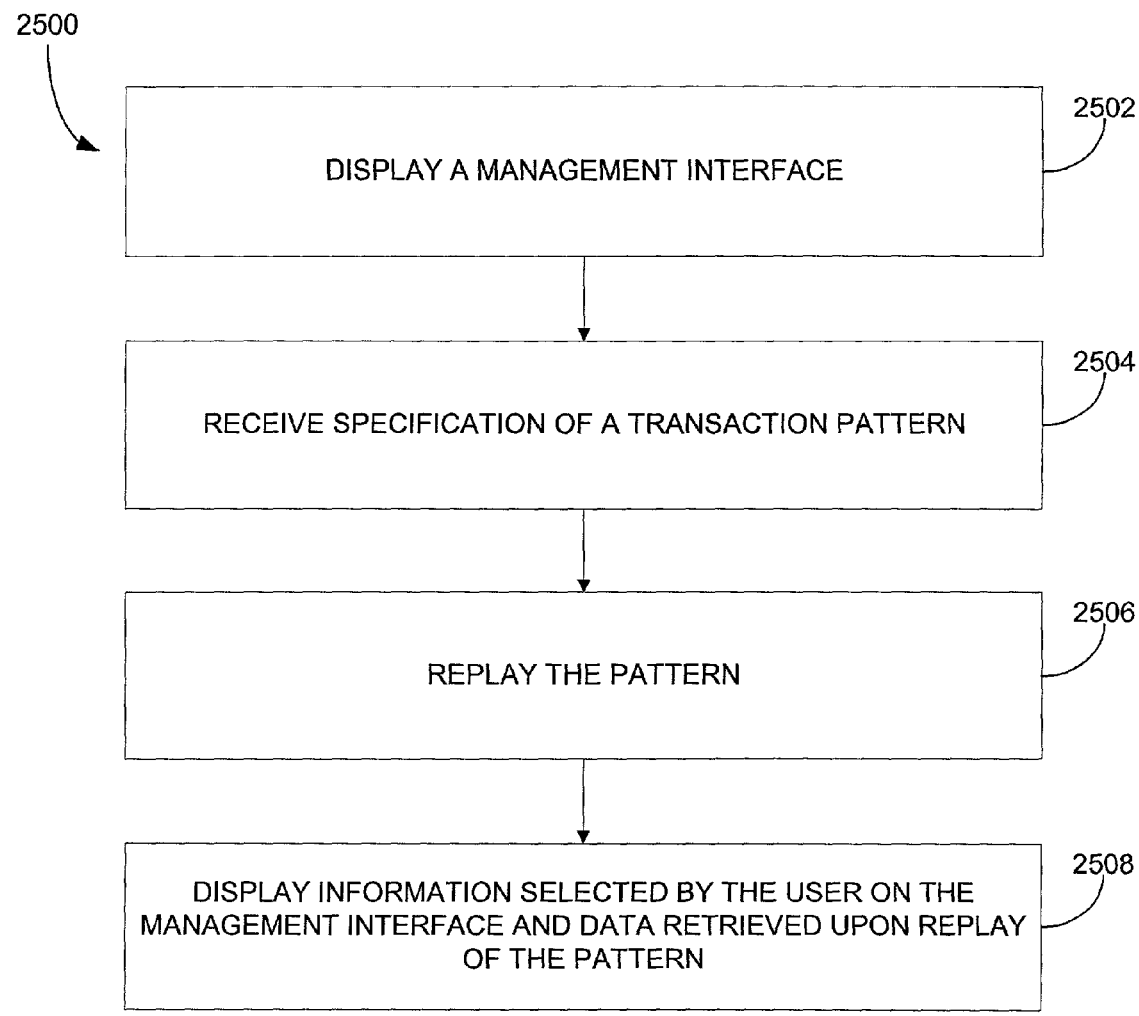
FIG. 25 is a flowchart of a process for generating a customizable network user interface according to one embodiment.

FIG. 25 is a flowchart of a process 2500 for generating a customizable network user interface according to one embodiment. A management interface, that allows a user to select and manage information displayed on an information screen, is presented in operation 2502. In operation 2504, a specification of a transaction pattern is received from a user, an administrator, another application, etc. The pattern performs an interaction with a remote data source, which can be a remote application, a web page, a legacy application, etc., for retrieving data upon replay of the pattern. The pattern is replayed in operation 2506 for retrieving the data. In operation 2508, the information selected by the user on the management interface and the data retrieved upon replay of the pattern are displayed on the information screen.

For example, if a user wants to get specific stock information, the user would ordinarily have to go to website, log in, go to the appropriate page, and view the data. The process of FIG. 25 allows the user to select and/or record a pattern that does all of the foregoing and retrieves the data for output in the habitat.

According to one embodiment, the execution of the transaction pattern includes submission of required parameters during the transaction. The execution of the transaction pattern can involve automatic navigation during the transaction.

More information about pattern recording and replay can be found in U.S. patent application entitled SYSTEM, METHOD AND COMPUTER PROGRAM PRODUCT FOR THE RECORDING AND PLAYBACK OF TRANSACTION MACROS, from which priority is claimed; and U.S. patent application entitled SYSTEM, METHOD AND COMPUTER PROGRAM PRODUCT FOR PATTERN REPLAY USING STATE RECOGNITION, filed Aug. 28, 2001 under Ser. No. 09/942,080; each of which are herein incorporated by reference.

Content from Enterprise Applications

Figure 26:
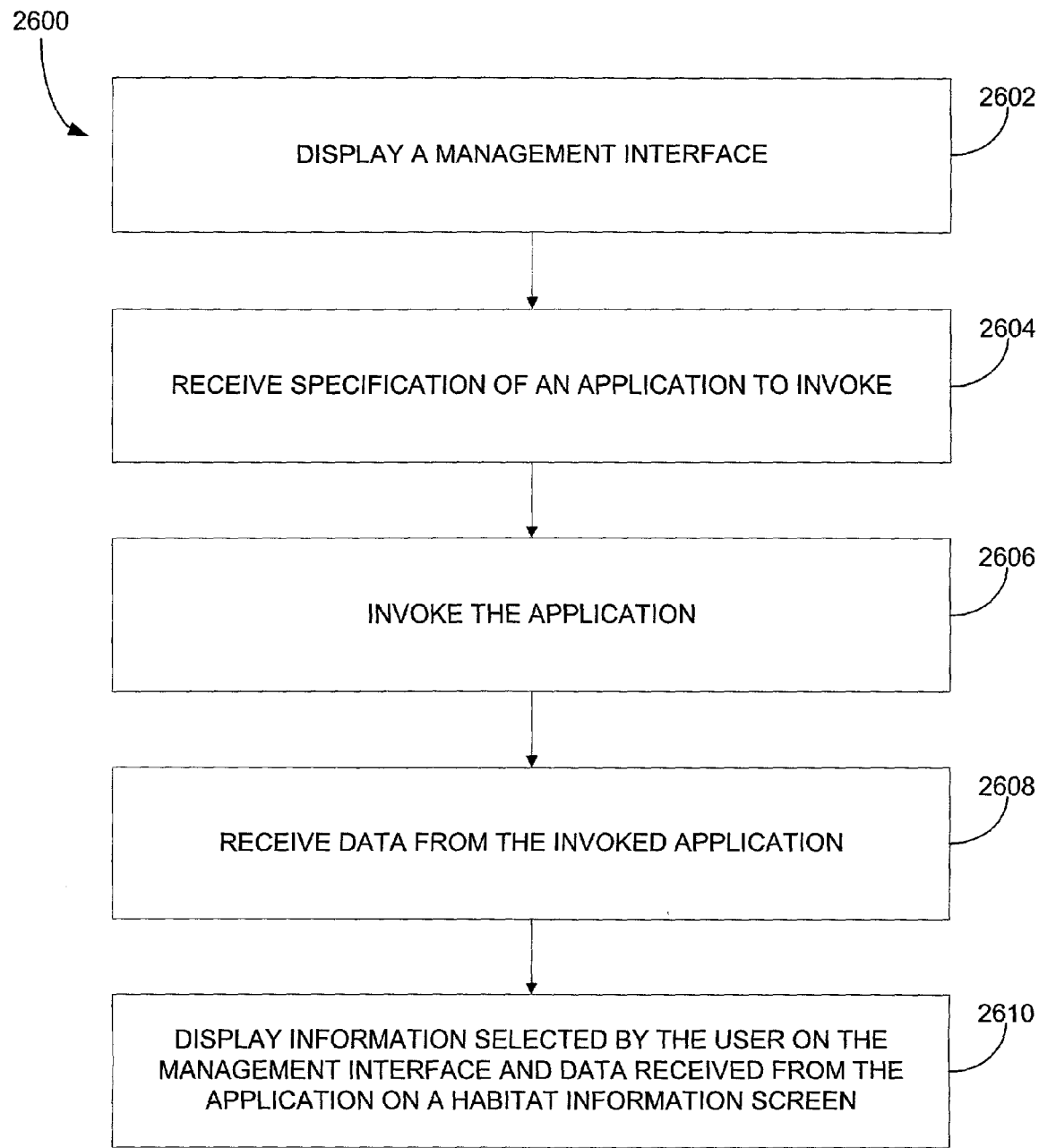
FIG. 26 is a flow diagram of a process for generating a customizable network user interface for interacting with a legacy application.

FIG. 26 is a flow diagram of a process 2600 for generating a customizable network user interface for interacting with a legacy application, i.e., invoking that application and retrieve data from it. In operation 2602, a management interface is displayed for allowing a user to select and manage information displayed on an information screen. A specification of an application to invoke is received in operation 2604. The application is invoked in operation 2606 by interfacing with it. In operation 2608, data is received from the invoked application. User-selected information and the data received from the application are displayed on the information screen in operation 2610.

For example, using the process of FIG. 26, data from some legacy application, like a Customer Relationship Management (CRM) application, can be retrieved by invoking the application and output in the habitat. To invoke the application, a custom interface that is used to interact with the application can be used, as can a pattern that interacts with the application upon its replay.

In an example of use, suppose an enterprise system has a table of sales figures for the day that are managed by some other application. The user can log into the habitat and go to one of the windows, where the user requests the data. The user enters a code and the habitat invokes the remote application. The application runs to process the table. The system retrieves the output from the application and places the output in the habitat.

Using EH on a PDA

After the EH has been set up with the browser, the user can access the content from a Personal Digital Assistant (PDA), handheld computer, etc. The user can also perform some EH tasks from the PDA such as adding, deleting, and renaming views and windows, as described above. Illustrative operating system include the Palm O/S and the MICROSOFT® Pocket PC O/S.

The following sections describe how to access the EH from a PDA, and how to edit views, windows, and content. One skilled in the art will understand that the following description is equally applicable to other portable devices.

Logging In

The user first logs in to the EH using the user's regular EH user name and password. To log in to EH from a PDA:
1. Complete the setup for the specific PDA. Some examples follow:
   (For Palm VII) From a desktop browser download a Palm Query App (pqa) from the EH login page. Sync the Palm to transfer the pqa files.
   (For Palm V using Avantgo browser) Sign up for and download the Avantgo Mobile Internet Service. Set up the Habitat channel.
2. Open Habitat on the PDA. (For some PDAs, click a Habitat icon; for others, browse to the Habitat channel or type in the URL.)
3. Type the EH user name.
4. Type the password, and click OK.
5. Click Login. The view list or the most recently accessed view appears.

Logging Out

To log out of EH, click the log out icon. The log in window is displayed.

Changing a Password

The user's password can be managed from a PDA using either the view or window menu. Once the password has been changed, the user must use the new password when logging in to EH from any device including a desktop machine. To change the password:
1. From any view or window, click the menu icon.
2. Click Change Password.
3. Type the old password and click OK.
4. Type the new password and click OK.
5. Re-enter the new password and click OK.
6. Click Change.
7. Click OK.

Navigating on a PDA

Figure 27:
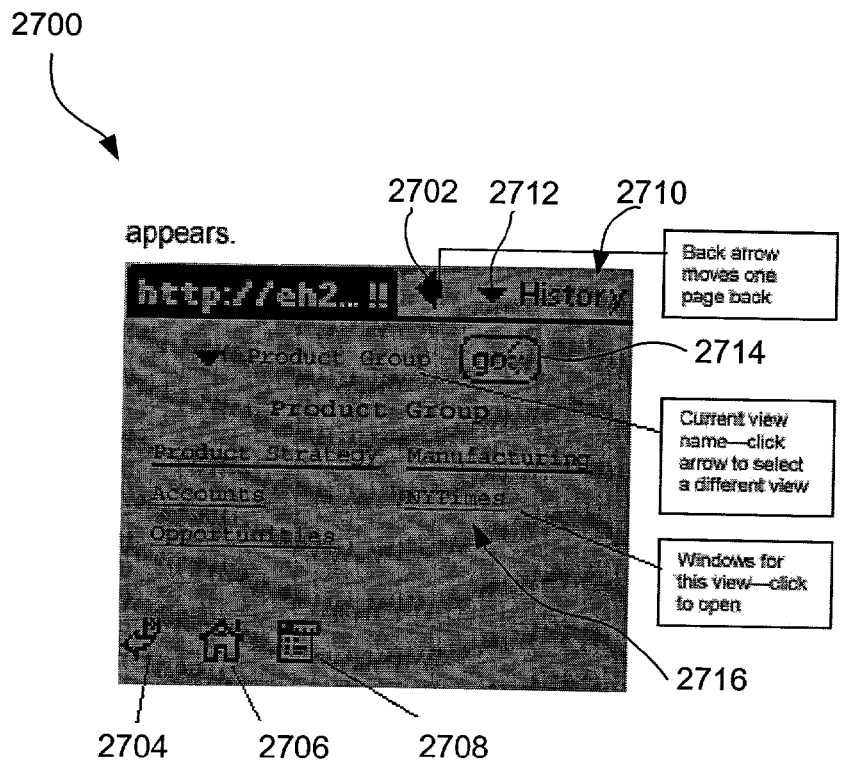
FIG. 27 is a drawing of a home page of the EH on a PDA.

This section describes general conventions for navigating EH on a PDA. When a user logs in for the first time, the user's home page containing a view list is displayed. FIG. 27 is a drawing of a home page 2700 on a PDA. To navigate EH from a PDA:
1. Click the back arrow 2702 to move to the previous page.
2. Click the log out icon 2704 to log out.
3. Click the Home icon 2706 to return to the view list.
4. Click the menu icon 2708 to open the action menu to add, delete, and rename views and windows, and change the password.

Opening Views

From the home page, click the view name 2710 to open a view. To switch to another view, click on the down arrow 2712 next to the view name at the top of the screen to open a drop down menu listing the views. Select the desired view, and click Go 2714.

The first time the user logs in, the home page displays. After this, the most recently accessed view displays rather than the home page. To switch to another view, click on the down arrow next to the view name at the top of the screen. Select the desired view, and click Go.

Opening Windows

When opening a view, the window names 2716 in the view appear as links. Window names longer than a prespecified number of characters can be truncated. Click the window name to open it. To switch to another window, click on the down arrow next to the window name at the top of the screen. Select the desired window, and click Go.

Opening Content

Figure 28:
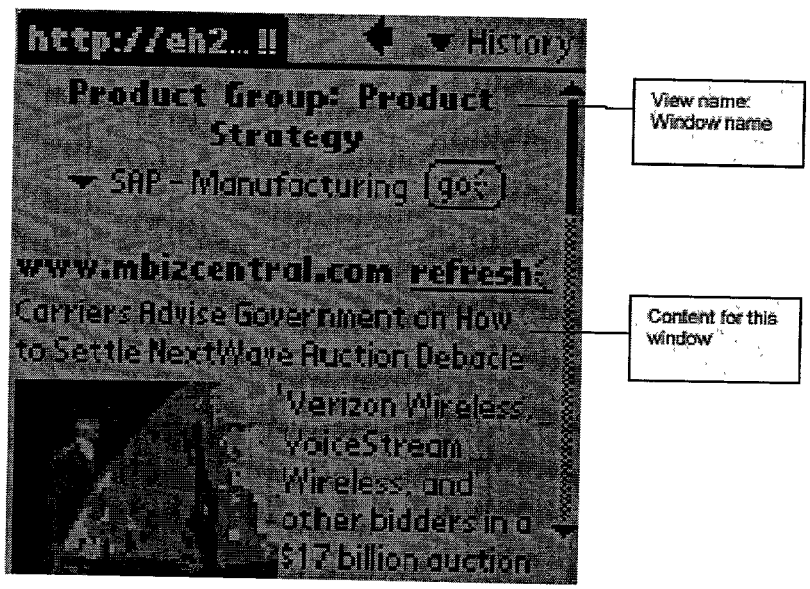
FIG. 28 is a drawing of a window displaying content on a PDA.

FIG. 28 is a drawing of a window 2800 displaying content on a PDA. Content sources appear as links on the PDA. Click on the link to see the content. If content such as a form is in the Habitat, the user may need to click Retrieve to get the content.

In the EH, the user can add links to any type of file such as a MICROSOFT® Word or Excel document, or a Portable Document Format (PDF) file. In some cases, only text files (.txt) may be viewable on the device. In such a case, if an attempt is made to view other types of files, a message stating that the file cannot be opened is displayed.

Working with Views

The user can preferably see all EH views with the PDA. The user can add, rename, and delete views using the PDA. Optionally, these changes can take effect for the entire EH.

Adding Views

To add a view:
1. From any view, click the menu icon.
2. Click Add View.
3. Type the name of the new view.
4. Click Add View. The new view appears with one empty window.

Renaming Views

To rename a view:
1. Open the view to be renamed.
2. Click the menu icon.
3. Click Rename View.
4. Type the new view name.
5. Click Rename. The view menu appears with the new name.
6. Click Done.

Deleting Views

When a user deletes a view, any windows and content contained in the view is deleted. To delete a view:
1. Open the view that to be deleted.
2. Click the menu icon.
3. Click Delete View.
4. Click Delete to confirm the deletion.

Working with Windows

From the browser, use the wireless icon 1210 to specify whether windows are available on wireless devices. See FIG. 12. By default all windows are wireless enabled. The user can add, rename, and delete windows from the PDA. Again, these changes can take effect for the entire EH. For more information on windows, see The Enterprise Habitat Environment (above).

Adding Windows

When a view is open, the user can add windows to that view. The maximum number of windows for a view can be prespecified.

To add a window:
1. Open the view in which to add a window.
2. Click the menu icon.
3. Click Add Window.
4. Type the name of the new window.
5. Click Add Window. The new window appears in the view.

Renaming Windows

To rename a window:
1. Open the window to be renamed.
2. Click the menu icon.
3. Click Rename Window.
4. Type the new window name.
5. Click Rename. The window menu appears with the new name.
6. Click Done.

Deleting Windows

To delete a window:
1. Open the window to be deleted.
2. Click the menu icon.
3. Click Delete Window.
4. Click Delete to confirm the deletion. The view for the deleted window appears.

Using EH on a Wireless Phone

After setting up the EH with the browser, the user can access the content from a WAP-enabled phone. Illustrative phone browsers are Nokia Browser and Phone.com.

The following sections describe how to access the EH from a phone, and how to navigate views, windows, and content.

Logging In

The user must log in to the EH using the regular EH user name and password. To log in to the EH from a WAP-enabled phone:
1. Enter the Habitat Web address in the phone.
2. Type the EH user name and click OK.
3. Type the password and click OK.
4. Click Login. The user's view list appears.

Logging Out

To log out of EH, from any view or window, click Log out. The log in window is displayed.

Changing the Password

The user can change his or her password from a phone using either the view or window menu. If the user does this, the user must use the new password when logging in to EH from any device including a desktop machine. To change the password:
1. From any view or window, click Menu. The user might have to scroll down the page or click More to reach the Menu link.
2. Click Change Password.
3. Click More.
4. Scroll down, type the old password and click OK
5. Type the new password and click OK.
6. Re-enter the new password and click OK.
7. Click Change.

Navigating on a Phone

This section describes general conventions for navigating EH on a phone. When the user logs in the view list appears. To navigate EH from a phone:
1. Click Up to move up one level in the Habitat hierarchy, for example, to move from a window to a view.
2. Click More to move forward through content. Because WAP devices have a maximum page size, content is broken across pages; use the More button to navigate through the pages.
3. Click Back to move back through content or pages.
4. Click Refresh to refresh the content.
5. Click Menu to open the action menu to add, delete, and rename windows or views, or to change the password. The user might have to scroll down the page or click More to reach the Menu link.
6. Click Log out to log out.

Opening Views

To open a view, click on the view name.

Opening Windows

Open a view to see the windows contained in the view. Click the window name to open it. Window names may be truncated.

Opening Content

Content source names appear as bold text on the phone. Click on the content source name to see the content. In the EH the user can add links to any type of file such as a Microsoft Word or Excel document, or a Portable Document Format (PDF) file. In some cases, only text files (.txt) on the device can be viewed. If the user attempts to view other types of files, a message stating that the file cannot be opened is displayed.

Working with Views

Preferably, the user can see all EH views with a phone. The user can add, rename, and delete views using a phone. Keep in mind that these changes take effect for the entire EH.

Adding Views

The maximum number of views for the wireless Habitat can be predetermined. To add a view:
1. From any view, click Menu. The user might have to scroll down the page or click More to reach the Menu link.
2. Click Add View.
3. Type the name of the new view and click OK.
4. Click Add View. The new view appears with one empty window.

Renaming Views

To rename a view:
1. Open the view to be renamed.
2. Click Menu. The user might have to scroll down the page or click More to reach the Menu link.
3. Click Rename View.
4. Type the new view name and click OK.
5. Click Rename. The view menu appears with the new name.

Deleting Views

When deleting a view, any windows and content contained in the view is deleted. To delete a view:
1. Open the view to be deleted.
2. Click Menu. The user might have to scroll down the page or click More to reach the Menu link.
3. Click Delete View.
4. Click Delete to confirm the deletion. The view list appears.

Working with Windows

From the browser, use the wireless icon to specify whether windows are available in the wireless device. By default all windows are wireless enabled. The user can add, rename, and delete windows from the phone. Keep in mind that these changes take effect for the entire EH.

Adding Windows

When a view is open, the user can add windows to that view. The maximum number of windows for a view can be preset. To add a window:
1. Open the view to which a window is to be added.
2. Click Menu. The user might have to scroll down the page or click More to reach the Menu link.
3. Click Add Window.
4. Type the name of the new window and click OK.
5. Click Add Window. The new window appears in the view.

Renaming Windows

To rename a window:
1. Open the window to be renamed. The user might have to scroll down the page or click More to reach the Menu link.
2. Click Menu.
3. Click Rename Window.
4. Type the new window name and click OK.
5. Click Rename. The window menu appears with the new name.

Deleting Windows

To delete a window:
1. Open the window to be deleted.
2. Click Menu. The user might have to scroll down the page or click More to reach the Menu link.
3. Click Delete Window.
4. Click Delete to confirm that the window is to be deleted. The view for the deleted window appears.

Administrative Tools

The Habitat Administrator Tool allows users with administrative privileges to manage users and to assign them to groups. The tool also lets the administrator set user and group access to Habitat content and features.

The Habitat Administrator Tool can be used to set up the hierarchy of users and groups in a company in order to control user access to content and tasks in Habitat. The tool is also used to add and delete content from the Habitat Default List. The content that users are able to access can be specified at the level of category, subcategory, or individual content item.

The super user sets up the initial hierarchy of the company. All groups and users are organized within this overall hierarchy.

Figure 29:
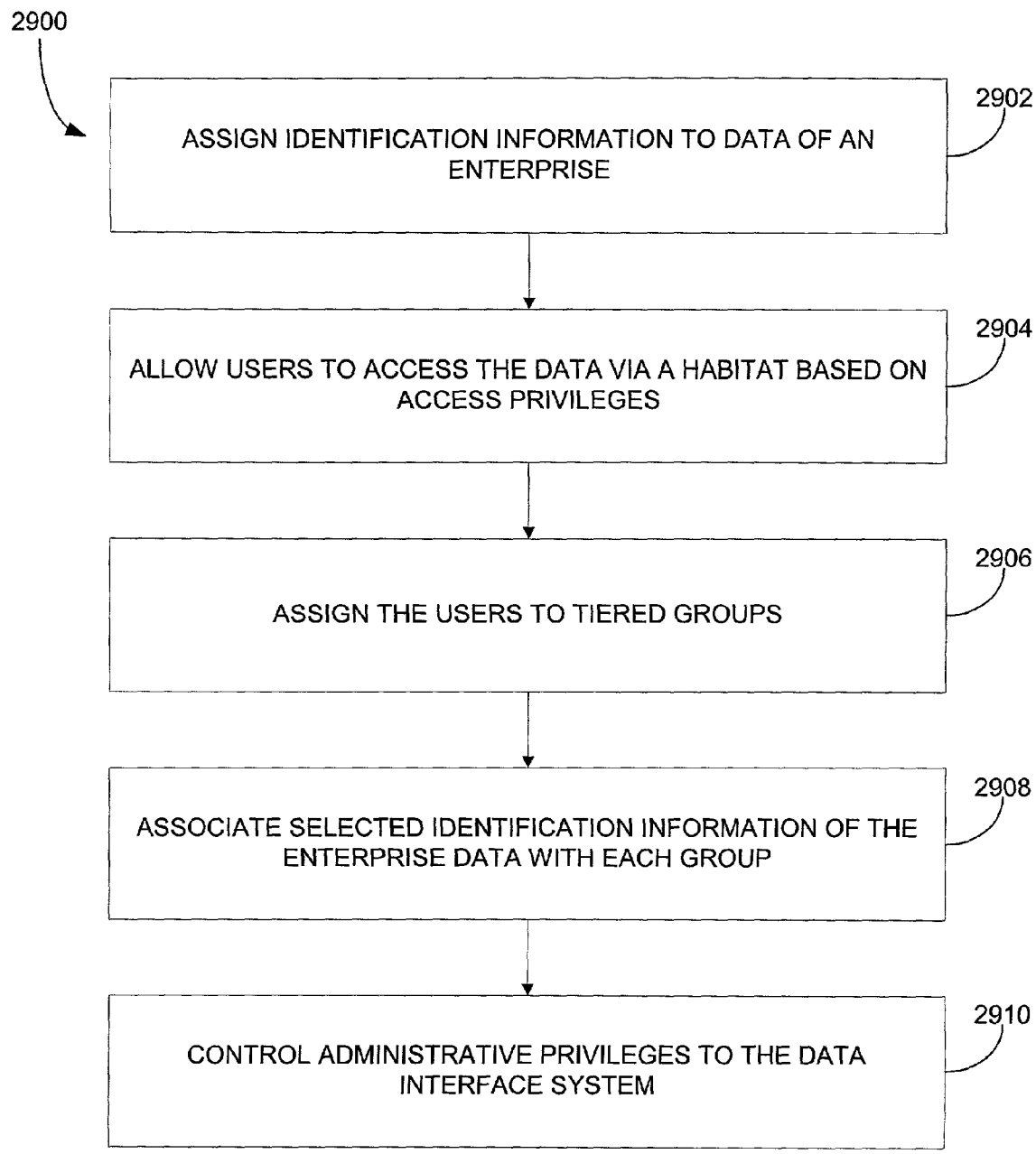
FIG. 29 is a flow diagram of a process for managing an enterprise network data interface system according to one embodiment.

FIG. 29 is a flow diagram of a process 2900 for managing an enterprise network data interface system (the Habitat Administrator Tool) according to one embodiment. In operation 2902, identification information is assigned to data of an enterprise (i.e., business or organization). Enterprise data can include documents, email, spreadsheets, data in a database, web content, output of other applications, or any other type of data. In operation 2904, users are allowed to access the data via a habitat based on access privileges. The users are assigned to tiered groups in operation 2906. The tiers can be based on particular access privileges. Selected identification information of the enterprise data is associated with each group in operation 2908. Users in a particular group are allowed to access data associated with their particular access tier. Users in a particular group are also allowed to access data associated with a group in a lower tier. Administrative privileges to the data interface system are controlled in operation 2910. The administrative privileges can also be tiered. A user on a particular administrative tier has administrative rights over all users in lower administrative tiers.

In an example of use of the EH in a company, a CEO is the top level officer. Below the CEO are second level officers. Below them are third level employees. A default data list is built by adding enterprise data to a directory, or content list. Assume there are 100 items in the content list. The CEO has privileges to see all items. The CEO can set the permission for the CFO to see only 98 items, and the CTO to see 90 items. The CFO then sets privileges for those 98 items to persons below her. The CEO can also set the same privileges for everyone on level 2 (as a group level privilege). The CEO can go in and adjust the privileges later if desired. The CEO can also view privileges of everyone in the lower levels. For other users, the ability to view privileges of other only goes down the branch. Thus, the CTO can't see what CFO is doing, as they are on the same level.

Guidelines

Users with manager privileges can create and update groups.

Users with manager privileges can only update the groups they create.

The super user assigns manager privileges.

Managing Cobrands or Partners

Customized Habitats can be created for different partners, which are called cobrands. Cobrands allow a user to set up as many different Habitat environments as desired. Each Habitat can contain the company logos for the partner as well as specialized content applicable to the partner. The Habitat assigns a unique URL to each cobranded site.

Creating Cobrands

First, create a user name and password to generate a cobrand URL. Then, the user can log in with that user name and password to create a customized Habitat for that partner. To create a cobrand:
1. Log in to Habitat with the super user password.
2. Click Cobrand.
3. Complete the fields as described in Table 1, and click Submit.
4. Click Back to Main Page.

TABLE 1

| Field | Description |
| --- | --- |
| Partner | The name to assign this partner. A short name is recommended as this name is used in the URL for users. |
| Logo | The complete path for the logo file. The user can also browse to the file location. |
| Root Username | The name to assign as the super user for this partner. Use 6-12 alphanumeric characters. |
| Root Password | The password to assign to the super user for this partner. Use 6-10 alphanumeric characters. |
| Re-enter Root Password | Re-type the password for verification. |

Managing User Accounts

About Accounts

Accounts contain the individual user's information such as name, title, contact information, and content access privileges. Accounts are added for each user that can access Habitat. Then, the privileges for each user are set to determine what content they can see, and what actions (for example, adding or deleting windows) they can perform in Habitat.

About the Super User

The super user has administrative rights over the entire Administration Tool. This is preferably the only user who can access all accounts in the system and make changes. Other users can have manager rights, but this preferably gives them access only to subordinate users—not to their own account or accounts in other company groups.

The super user sets up the initial enterprise hierarchy for the Habitat. This user assigns manager rights to the appropriate persons and sets up their permissions to view Habitat content and perform Habitat tasks.

Adding Accounts

When setting up user accounts, first add the empty account. Then, edit the account to populate it with information such as name and access privileges. To add a user account:
1. Click Accounts.
2. Click Add/Edit.
3. Type the number of accounts to be added.
4. Click Add. The specified number of accounts is added. The accounts appear with the name Edit on the accounts page.
5. Add account information to each account. See Editing Accounts (below).

Editing Accounts

After accounts have been added, the accounts are updated to enter individual user information and access privileges. To edit an account:
1. Click Accounts.
2. Click Add/Edit.
3. Click the account name to be edited.
4. Enter the account fields as described in Table 2.
5. Set the access privileges. See Setting User Privileges (below).
6. Click Save.

TABLE 2

| Field | Description |
| --- | --- |
| First Name | The user's first name. |
| Last Name | The user's last name. |
| Middle Initial | The user's middle initial. |
| Title | The user's company title. |
| Email Address | The user's email address. |
| Manager? | Whether this user should have "Manager privileges." Manager privileges allow the user to perform certain administrative tasks. |
| Number of Employees | The number of employees for which this user is the manager. Creates this number of blank user accounts and places them in a subordinate position in the Habitat hierarchy. All subordinate users will inherit the privileges of this user. |
| Active | This user account is active. |
| Inactive | This user account is not active, but remains in the Habitat archive. |
| External | Whether this user is outside of the company. |
| Account | For example, the user could be from a partner company, and need access to specific Habitat information. |

Deleting Accounts

When user accounts are deleted, they are preferably archived. This allows them to be reactivated at a later time. If there are any subordinates for a user, they can be moved up one rung in the hierarchy, but will maintain their current privileges until changed. To delete a user account:
1. Click Accounts.
2. Click Delete.
3. Click OK to verify deletion of the account.

Searching Accounts

A user can search for active or archived accounts by name or department name. To search for an account:
1. Click Accounts.
2. Click Directory.
3. Type the account name, department name, or any portion of these names to search.
4. Select whether to search Active or Active and Archived accounts. Active groups are currently functional while archived groups are not.
5. Click Search.
6. To make any changes to the account, click Edit on the far right of the table.

Setting User Privileges

Access to the content in the Habitat Default List and to certain Habitat features is set both at the group and the individual user level. By default users inherit the access privileges of the group. However, access to individual features or content items can also be set for each user.

Which users have "manager privileges" can also be designated. Manager privileges allow users to perform certain administrative functions such as creating and updating groups, creating and updating users subordinate to them in the Habitat hierarchy, and setting user privileges for subordinate users.

Restricting Feature Access

Restricted features can be selected, and access privileges set, as the Habitat hierarchy is created. For example, an administrator may want to limit access to the feature that allows users to change the Habitat colors, particularly where the enterprise has standard corporate colors that are used to brand the site. In this case, privileges for users with manager privileges are set up first, and the ability to update colors is removed. All users subordinate to these users would automatically inherit the inability to access the color feature.

Another feature that can be restricted is adding content to the Default List. Because this is content that is viewed by the entire company, the administrator may want to assign certain users the ability to add content here.

Guidelines

Plan the company hierarchy to determine which users should have manager privileges and what groups to create.

Plan what features to restrict.

Setting Access to Habitat Features

The features that a user can access can also be limited. All features available in the Edit View such as adding content, adding links to files, and removing items can be limited. Users inherit the privileges of their manager (the person above them in the Habitat hierarchy) by default, but access to individual features can be changed.

The super user can also limit access to administrative features such as adding accounts and groups. To set access to Habitat features:
1. Click Accounts.
2. Click Add/Edit.
3. Scroll to the ACCESSIBILITY CONTROLS section and click the red arrow. The Habitat features the user can access are checked.
4. To remove access to Habitat features clear the check box next to it.
5. Click Save.

Setting Access to the Default List

Users inherit the privileges of their manager (the person above them in the Habitat hierarchy) by default. To adjust those privileges, the categories, subcategories, or content items the user can access are selected. To set access to the default list:
1. Click Accounts.
2. Click Edit.
3. Scroll to the CONTENT ACCESS section and click the red arrow. The categories, subcategories, and items the user can access are checked.
4. To remove an individual content item, clear the check box next to it.
5. Click Set Access. A confirmation message displays.

Managing Groups

Groups are used primarily to determine what content and Habitat functions (for example adding and deleting views, windows, and content) users are allowed to access. User accounts inherit these access privileges from their group.

There are two types of groups:
Organizational
User-created

Organizational groups are based on the company hierarchy or a hierarchy that meets company needs. Using a custom script, Habitat can create these groups when the Habitat is installed. The basic structure can be changed with the Administration Tool. That is, organizational groups can be archived or new groups created. Also, what content the group can access can be changed as well as the Habitat features it can access.

User-created groups are those that the super user or users with manager privileges create. As many groups as desired can be created, to organize the company, partners, customers, and so on.

Whether a group is organizational or user-created can be determined when the edit page is opened. Organizational groups allow access to: Content Access and Accessibility Controls. User-created groups allow access to rename the group, add or remove members, and archive the group.

Guidelines
Organizational groups that are created during installation can be archived.
Creation of new organizational groups may or may not be allowed.
A user may be required to have manager rights in order to create a user-created group.
A user can preferably only update or delete user-created groups that that user created.
User accounts inherit the privileges of the group, but individual access to content or features can be changed.

Adding Groups

Preferably, the user must have super user or manager rights to add a group. To add a group:
1. Click Groups.
2. Click Add.
3. In GROUP LOCATOR, select the group to which the new group is to be added and click Next.
4. Select a subgroup for the new group (if needed) and click Next to advance to the next subgroup (if needed).
5. Click Open.
6. Type a name for the group and click Save.
7. Type the email address for the account to be added to the group.
8. Select whether an email is to be sent to the account added to the new group.
9. Click Save.

Editing Groups

The group can be renamed, and group members can be added or removed. An email can be sent to the affected members to notify them of the change.
Add member: Email sent to the new member.
Remove member: Email sent to the member removed.
Rename group: Email sent to entire group.
To edit a group:
1. Click Groups.
2. Click Edit.
3. In GROUP LOCATOR, find the group by making a selection from the list and clicking Next to navigate through subgroups.
4. Click Open.
5. Change the desired information:
Type a new name for the group.
Type the email address(es) to add new accounts to the group. Add one address at a time.
On the far right of the window, select Remove to remove an account from the group.
6. Select whether an email is to be sent to the accounts affected by the change.
7. Click Save.

Viewing All Groups
To view all groups:
1. Click Groups.
2. Click Directory.
3. Leave the search field blank and select Active or Active and Archived accounts. Active groups are currently functional while archived groups are not.
4. Click Search. A list of all groups is displayed.
To make changes to a group, click Edit.

Viewing Group Membership

If a user has manager privileges, that user can only add or delete users for groups the user created, but the user can view which groups another user belongs to. To view the groups a user belongs to:
1. Click Accounts.
2. Select the account and click Edit.
3. Scroll to the WORK GROUP ACCESS section. All groups the user belongs to are listed.

Moving Users Between Groups

A user can be moved to another group as needed. If there are any subordinates for this user, they will remain in the group and will maintain their current privileges. To move a user to a new group:
1. Click Accounts.
2. Click Add/Edit.
3. Click the account name to be moved.
4. Next to Name of Department, click Relocate.
5. Select the new group by making a selection from the list and clicking Next to navigate through subgroups.
6. Click Save.

Archiving Groups

Groups do not have to be permanently deleted; they can be archived, which means they are no longer functional.

Preferably, a user can only archive groups that the particular user has created. When a group is archived, the user can also choose to send an email to all group members to notify them of the change. To archive a group:
1. Click Groups.
2. Click Edit.
3. In GROUP LOCATOR, find the group by making a selection from the list and clicking Next to navigate through subgroups.
4. Click Open.

5. Select Close and archive this group.
6. Select whether an email is to be sent to the accounts affected by the change.
7. Click Save.

Searching Groups

A user can search for groups by keyword or by navigating the group hierarchy. To search for a group by keyword:
1. Click Groups.
2. Click Directory.
3. Type the group name, department name, or any portion of these names to search.
4. Select whether to search Active or Active and Archived accounts. Active groups are currently functional while archived groups are not.
5. Click Search. To view all groups, leave the search field blank and select Active or Active and archived.

To search for a group by hierarchy:
1. Click Groups.
2. Click Directory.
3. Under GROUP LOCATOR, find the group by making a selection from the list and clicking Next to navigate through subgroups.

Managing Content

Source content is content that appears in the Default List in Habitat. The Source Content feature allows configuration of the content in the Default List. Preferably, only the super user has privileges to alter the main structure of the Default List. However, within the main structure, users with manager privileges can add content or update content sources that they have created.

Source content can be organized visually with the standard Windows directory structure: content items and patterns are stored in folders. Users must have privileges assigned under "Accessibility Controls" to add content from the list to their Habitat. See Setting Access to Habitat Features. They must have privileges assigned under "Content Access" to view specific content. See Setting Access to the Default List.

Adding Source Content

Web content, patterns, or pre-loaded utilities such as Outlook mail can be added. To add Web content:
1. Click Source Content.
2. Click Add.
3. Type the URL of the Web site to add and select whether to capture a table, form, or neither.
4. Click Go. The Web page loads in the top panel. If table or form is selected, the Web page contains a border surrounding and a tab attached to each table or form within the page. The viewing area can be increased by dragging downward the bar separating the Web page from the content source view. If "No Highlighting" was selected and the user decides to view the tables or forms, clicking Enable Tables, or Enable Forms activates the tabs.
5. Drag the content to the directory in which to locate the content:
    Tables: Drag the Table tab to the directory. The user can also click the Table tab to select a specific row or cell in the table. Use the Back and Forward tabs to display or hide the rows and cells.
    Forms: Drag the Form tab to the directory.
    Images or links: Drag the image or link to the directory.

To add a pattern:
1. Click Source Content.
2. Click Add.
3. Select a pattern from the list and click Enter.
4. Drag the pattern name to the directory where it is to be located.

To add a utility:
1. Click Source Content.
2. Click Add.
3. Select a pattern from the list and click Enter.
4. Drag the utility name to the directory where it is to be located.

Adding a New Category

A new category (directory) can be added to the source content list. To add a new category:
1. Click Source Content.
2. In the directory structure, right-click the directory where in which to add a category, and click New Category. A new directory displays with the name New Category.
3. Click the name twice slowly, and type a name for the category.

Renaming Source Content or Categories

Preferably, a user can only rename source content or categories that the user has created. To rename source content or categories:
1. Click Source Content.
2. In the directory structure, right-click the content item or category to rename, and click Rename.
3. Type a new name and press Enter.

Deleting Source Content or Categories

Preferably, a user can only delete source content or categories that the user has created. To delete source content or categories:
1. Click Source Content.
2. In the directory structure, right-click the content item or the category to delete and click Delete.

Searching Source Content

To search source content:
1. Click Source Content.
2. Click Search.
3. Type the keyword to search for.
4. Click Search. The results table displays the number of items in the directory containing the content, and the number of users that have the content item in their Habitat.

To edit the item, select Edit next to the content item name and click Edit. The content item is highlighted in the directory structure. Right-click the item to rename or delete it.

External Application Interface with Habitat

Figure 30:
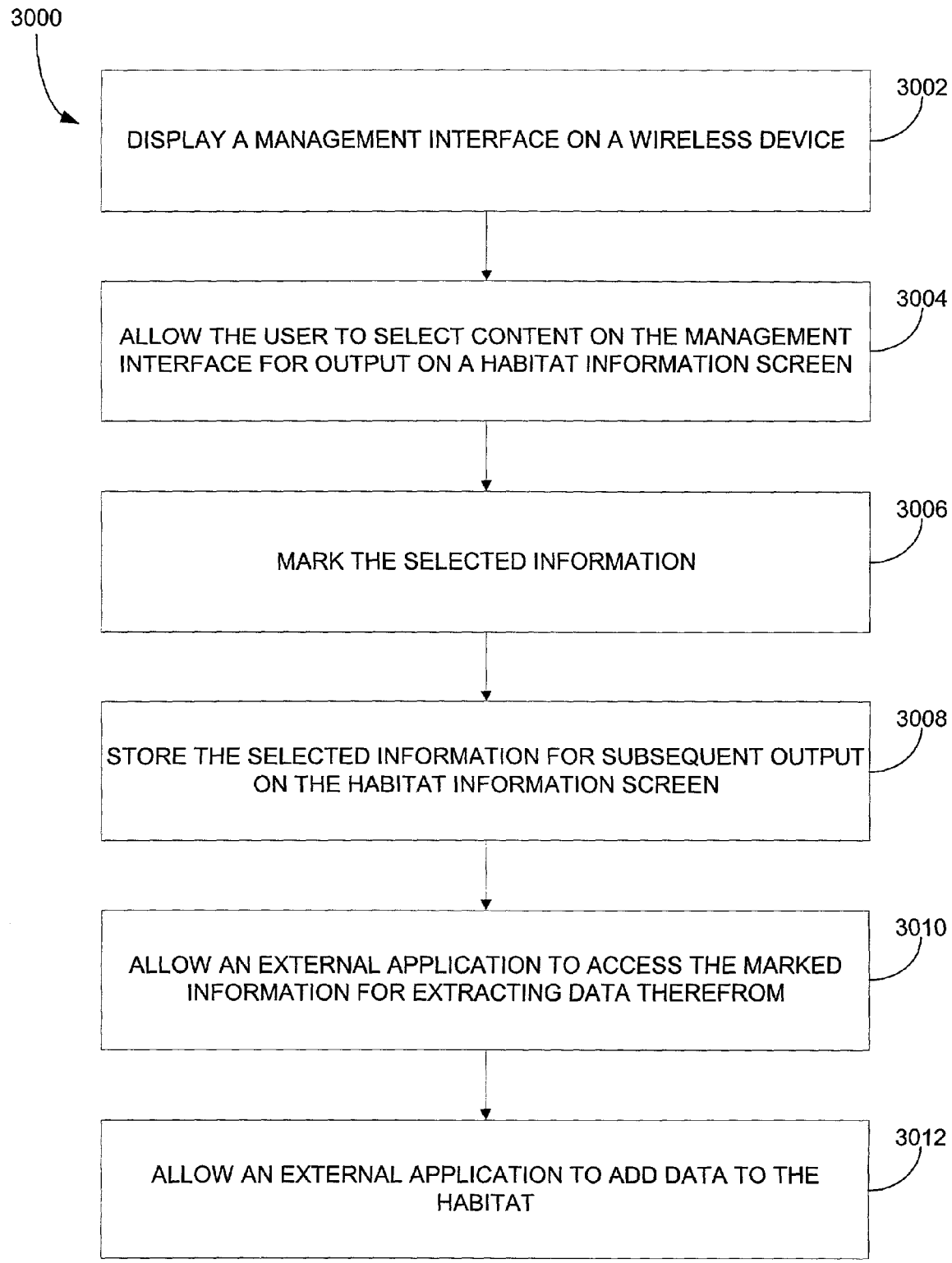
FIG. 30 is a flow diagram of a process for generating a network user interface with sharable data.

FIG. 30 is a flow diagram of a process 3000 for generating a network user interface with sharable data. A management interface, that allows a user to select and manage information displayed on an information screen of a habitat, is displayed in operation 3002. The management interface includes information of one or more content sources. In operation 3004, the user is allowed to select portions of the information available in the content source(s). The selected information of the content source is marked in operation 3006. In operation 3008, the marked information is stored in the habitat for subsequent output on the information screen. In operation 3010, an external application is allowed to access the marked information for extracting data therefrom, such as in an XML file. The eternal application can access the information when the marked information is in storage or when displayed via an XML interface. The external application can also be allowed to add data to the habitat. Note operation 3012.

The process set forth in operation 30 allows any application to communicate with the habitat and interact with habitat data. Further, data can be exported from habitat using this mechanism.

Multilingual Capabilities in Habitat

Figure 31:
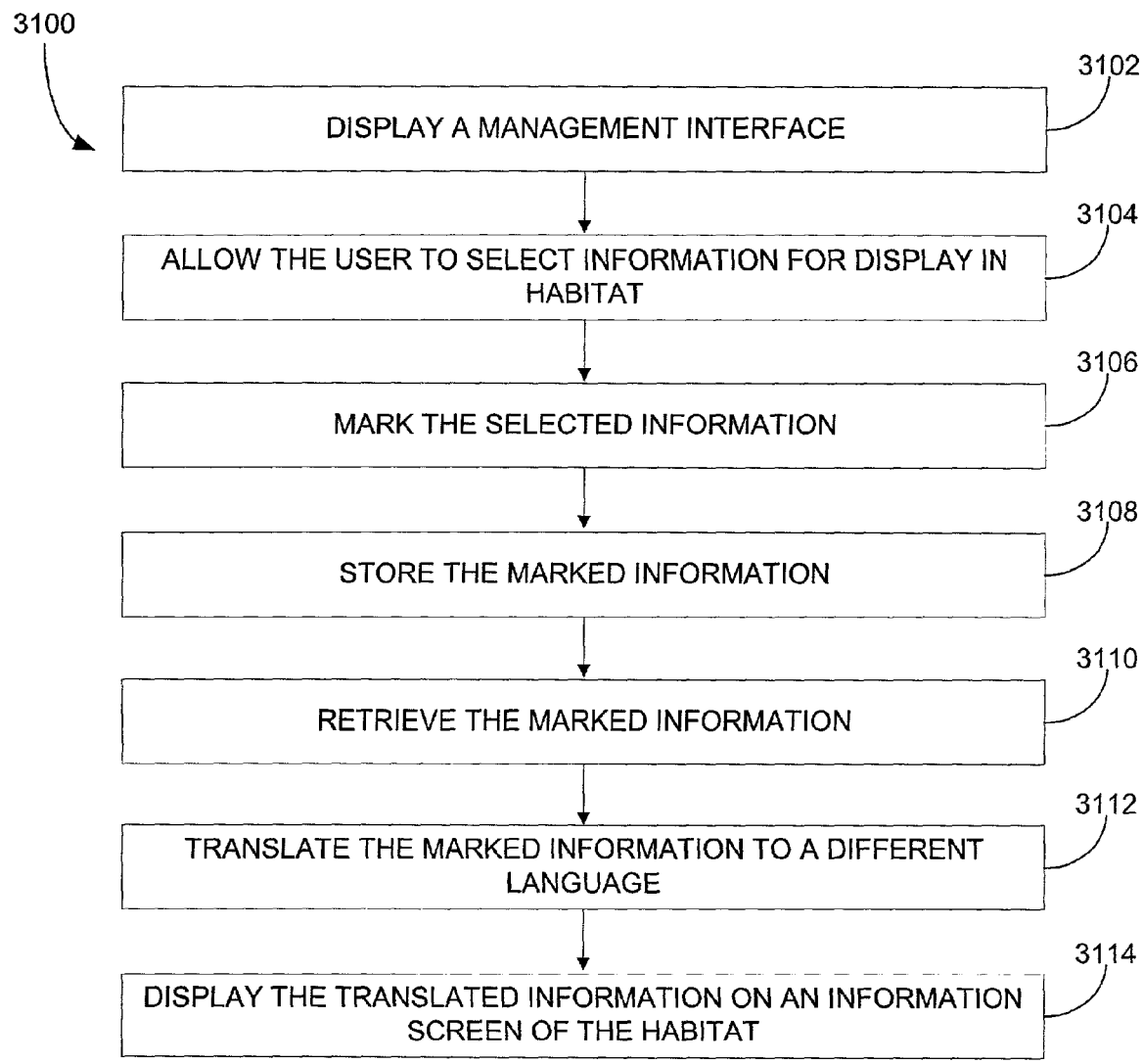
FIG. 31 shows a process for providing a customizable network user interface according to an embodiment.

FIG. 31 shows a process 3100 for providing a customizable network user interface according to an embodiment. In operation 3102, a management interface is displayed. The management interface allows a user to select and manage information displayed on an information screen, where the management interface includes information of at least one content source. In operation 3104, the user is allowed to select portions of the information available in the at least one content source. The selected information is marked and stored. Note operations 3106, 3108. The marked information is retrieved from storage in operation 3110 and, in operation 3112, translated to a different language than it was in as stored. For example the translation could be from English to Japanese, etc. The translated information is displayed on the information screen in operation 3114.

The information translated can be textual, in which case, the information is displayed in the character set of the language translated to. The marked information can also include audio data. The audio data can also be translated to a different language and output.

More description of methodology for translating information can be found in U.S. patent application entitled METHOD, SYSTEM AND APPARATUS FOR MULTILINGUAL TEXT PROCESSING, from which priority is claimed.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for generating a user-sharable network user interface, comprising:

displaying a management interface for allowing a first end user to select and manage information displayed on an information screen of a habitat, wherein the management interface includes information of at least one content source;

allowing the first end user to select portions of the information available in the at least one content source;

marking the selected information of the content source by determining an invariant descriptor of the selected information, the invariant descriptor including a description of a location of the selected information within the content source and distinguishing attributes of sub-sections of the content source that contain the selected information, wherein the description of the location includes a unique identifier of a table in the content source that contains the selected information and a position of the selected information within the table, the position including a specified row and column of the table, and wherein the distinguishing attributes include headers of the table, a number of columns in the table, fonts used in the table, and a border width of the table;

storing the marked information by storing the invariant descriptor;

retrieving the marked information using the invariant descriptor;

displaying the marked information on the information screen, wherein the information screen includes at least one view, wherein each view contains at least one window for displaying the marked information;

checking a permission status of a second end user for determining whether the second end user is authorized to see a window containing information selected by the first end user; and allowing the second user to view a window of the information screen if the second user is authorized;

wherein the invariant descriptor is converted into a hyperlink that contains the selected information and the invariant descriptor or a hyperlink to the selected information and the invariant descriptor.

2. The method as recited in claim 1, wherein the first end user sets permissions for allowing other users to view at least one of a view and a window of the information screen.

3. The method as recited in claim 1, wherein the second end user can add content to the window.

4. The method as recited in claim 1, wherein the second end user can remove content from the window.

5. The method as recited in claim 1, further comprising sending a notice to the second end user of the sharing of the window.

6. The method as recited in claim 1, wherein the allowing the first end user to select information displayed on an information screen of the habitat includes allowing the user to drag and drop information from remote sources onto the management interface for display on the information screen.

7. The method as recited in claim 1, wherein the at least one content source is not predefined.

8. The method as recited in claim 1, wherein the habitat retrieves the marked information, stores the marked information, and displays the marked information on the information screen.

9. The method as recited in claim 1, further comprising sending the hyperlink through a chosen window to a server when the first end user drags and drops the selected information into the chosen window.

10. A method for customizing a network user interface, comprising:

displaying a management interface on a wireless device for allowing a user to select and manage information to be displayed on an information screen of a habitat, wherein the management interface includes information of at least one content source and customization tools;

allowing the user to select portions of the information available in the at least one content source;

marking the selected information of the content source by determining an invariant descriptor of the selected information, the invariant descriptor including a description of a location of the selected information within the content source and distinguishing attributes of sub-sections of the content source that contain the selected information, wherein the description of the location includes a unique identifier of a table in the content source that contains the selected information and a position of the selected information within the table, the position including a specified row and column of the table, and wherein the distinguishing attributes include headers of the table, a number of columns in the table, fonts used in the table, and a border width of the table;

storing the marked information for subsequent output on the information screen by storing the invariant descriptor, wherein the subsequent output is based on retrieval of the marked information using the invariant descriptor; and allowing the user to interact with the customization tools via the wireless device for customizing the management interface;

wherein the invariant descriptor is converted into a hyperlink that contains the selected information and the invariant descriptor or a hyperlink to the selected information and the invariant descriptor.

11. The method as recited in claim 10, wherein the customization includes at least one of:
(a) adding a window to the information screen, the window being for displaying at least a portion of the marked information;
(b) deleting a window from the information screen;
(c) adding a view, the view including a plurality of windows;
(d) deleting a view, the view including a plurality of windows;
(e) adding a row of windows to a view; and
(f) changing user profile information.

12. The method as recited in claim 10, wherein the wireless device includes at least one of a wireless telephone, a Personal Digital Assistant (PDA), a handheld computer, and a pager.

13. A method for generating a customizable network user interface, comprising:
displaying a management interface for allowing a user to select and manage information displayed on an information screen;
receiving specification of a transaction pattern, the pattern being for performing an interaction with a remote data source for retrieving data upon replay of the pattern, the pattern storing at least one of information submitted by a creator of the pattern, actions taken by the creator, actions taken by a system to generate results, and results sent to the creator during recording of the pattern;
replaying the pattern for retrieving the data from the remote data source; and
displaying information selected by the user on the management interface and the retrieved data on the information screen;
wherein the data is retrieved by determining an invariant descriptor of the selected information, the invariant descriptor including a description of a location of the selected information within the remote data source and distinguishing attributes of sub-sections of the remote data source that contain the selected information, wherein the description of the location includes a unique identifier of a table in the remote data source that contains the selected information and a position of the selected information within the table, the position including a specified row and column of the table, and wherein the distinguishing attributes include headers of the table, a number of columns in the table, fonts used in the table, and a border width of the table; and using the invariant descriptor to retrieve the data;
wherein the invariant descriptor is converted into a hyperlink that contains the selected information and the invariant descriptor or a hyperlink to the selected information and the invariant descriptor.

14. The method as recited in claim 13 wherein the replaying of the transaction pattern includes submission of required parameters during the transaction, the required parameters being stored in the transaction pattern.

15. The method as recited in claim 13 wherein the replaying of the transaction pattern involves automatic navigation during the transaction without requiring input from the user specifically requesting the data.

16. A computer program product embodied on a computer readable medium, comprising:
computer code that displays a management interface for allowing a user to select and manage information displayed on an information screen;
computer code that receives specification of a transaction pattern, the pattern being for performing an interaction with a remote data source for retrieving data upon replay of the pattern, the pattern storing at least one of information submitted by a creator of the pattern, actions taken by the creator, actions taken by a system to generate results, and results sent to the creator during recording of the pattern;
computer code that replays the pattern for retrieving the data from the remote data source; and
computer code that displays information selected by the user on the management interface and the retrieved data on the information screen;
wherein the computer program product is operable such that the data is retrieved by determining an invariant descriptor of the selected information, the invariant descriptor including a description of a location of the selected information within the remote data source and distinguishing attributes of sub-sections of the remote data source that contain the selected information, wherein the description of the location includes a unique identifier of a table in the remote data source that contains the selected information and a position of the selected information within the table, the position including a specified row and column of the table, and wherein the distinguishing attributes include headers of the table, a number of columns in the table, fonts used in the table, and a border width of the table; and using the invariant descriptor to retrieve the data;
wherein the invariant descriptor is converted into a hyperlink that contains the selected information and the invariant descriptor or a hyperlink to the selected information and the invariant descriptor.

17. A system, comprising:
a processor;
logic that displays a management interface for allowing a user to select and manage information displayed on an information screen;
logic that receives specification of a transaction pattern, the pattern being for performing an interaction with a remote data source for retrieving data upon replay of the pattern, the pattern storing at least one of information submitted by a creator of the pattern, actions taken by the creator, actions taken by a system to generate results, and results sent to the creator during recording of the pattern;
logic that replays the pattern for retrieving the data from the remote data source; and
logic that displays information selected by the user on the management interface and the retrieved data on the information screen;
wherein the system is operable such that data is retrieved by determining an invariant descriptor of the selected information, the invariant descriptor including a description of a location of the selected information within the remote data source and distinguishing attributes of sub-sections of the remote data source that contain the selected information, wherein the description of the location includes a unique identifier of a table in the remote data source that contains the selected information and a position of the selected information within the table, the position including a specified row and column of the table, and wherein the distinguishing attributes include headers of the table, a number of columns in the table, fonts used in the table, and a border width of the table; and using the invariant descriptor to retrieve the data;

wherein the invariant descriptor is converted into a hyperlink that contains the selected information and the invariant descriptor or a hyperlink to the selected information and the invariant descriptor.

18. A method for generating a customizable network user interface, comprising:

displaying a management interface for allowing a user to select and manage information displayed on an information screen, wherein the selection of information includes allowing the user to drag and drop information from remote sources onto the management interface for display on the information screen;

receiving specification of an application to invoke;

interfacing with the application for invoking the application;

receiving data from the invoked application; and displaying user-selected information and the data received from the application on the information screen;

wherein the user-selected information is retrieved for display using an invariant descriptor of the user-selected information, the invariant descriptor including a description of a location of the user-selected information within a content source including the user-selected information and distinguishing attributes of sub-sections of the content source that contain the user-selected information, wherein the description of the location includes a unique identifier of a table in the content source that contains the user-selected information and a position of the user-selected information within the table, the position including a specified row and column of the table, and wherein the distinguishing attributes include headers of the table, a number of columns in the table, fonts used in the table, and a border width of the table;

wherein the invariant descriptor is converted into a hyperlink that contains the selected information and the invariant descriptor or a hyperlink to the selected information and the invariant descriptor.

19. A method for managing an enterprise network data interface system, comprising:

assigning identification information to data of an enterprise;

allowing users to access the data via a habitat based on access privileges;

assigning the users to groups, wherein the groups are tiered;

associating selected identification information of the enterprise data with each group;

allowing users in a particular group to access data associated with their particular access tier;

allowing users in a particular group to access data associated with a group in a lower tier; and controlling administrative privileges to the data interface system;

wherein the administrative privileges are tiered, wherein a user on a particular administrative tier has administrative rights over all users in lower administrative tiers;

wherein the habitat includes information selected from a content source, the selected information retrieved for display using an invariant descriptor of the selected information, the invariant descriptor including a description of a location of the selected information within the content source including the selected information and distinguishing attributes of sub-sections of the content source that contain the selected information, wherein the description of the location includes a unique identifier of a table in the content source that contains the selected information and a position of the selected information within the table, the position including a specified row and column of the table, and wherein the distinguishing attributes include headers of the table, a number of columns in the table, fonts used in the table, and a border width of the table;

wherein the invariant descriptor is converted into a hyperlink that contains the selected information and the invariant descriptor or a hyperlink to the selected information and the invariant descriptor.

20. The method as recited in claim 19, wherein the administrative privileges include at least one of: adding user accounts, deleting user accounts, editing user accounts, searching user accounts, setting data access privileges, assigning users to the access tiers, and associating data with the access tiers.

21. The method as recited in claim 19, wherein deleted user accounts are archived.

22. The method as recited in claim 19, wherein users are assigned to groups based on an organization structure of the enterprise.

23. The method as recited in claim 19, wherein a user with administrative privileges assigns users to groups.

24. A method for generating a network user interface with sharable data, comprising:

displaying a management interface for allowing a user to select and manage information displayed on an information screen of a habitat, wherein the management interface includes information of at least one content source;

allowing the user to select portions of the information available in the at least one content source;

marking the selected information of the content source by determining an invariant descriptor of the selected information, the invariant descriptor including a description of a location of the selected information within the content source and distinguishing attributes of sub-sections of the content source that contain the selected information, wherein the description of the location includes a unique identifier of a table in the content source that contains the selected information and a position of the selected information within the table, the position including a specified row and column of the table, and wherein the distinguishing attributes include headers of the table, a number of columns in the table, fonts used in the table, and a border width of the table;

storing the marked information in the habitat by storing the invariant descriptor for subsequent output on the information screen;

allowing an external application to access the marked information using the invariant descriptor for extracting data therefrom; and allowing the external application to add data to the habitat;

wherein the invariant descriptor is converted into a hyperlink that contains the selected information and the invariant descriptor or a hyperlink to the selected information and the invariant descriptor.

25. The method as recited in claim 24 further comprising allowing the external application to add data to the habitat.

26. A method for providing a customizable network user interface, comprising:

displaying a management interface for allowing a user to select and manage information displayed on an information screen, wherein the management interface includes information of at least one content source;

allowing the user to select portions of the information available in the at least one content source;

marking the selected information of the content source by determining an invariant descriptor of the selected information, the invariant descriptor including a description of a location of the selected information within the content source and distinguishing attributes of sub-sections of the content source that contain the selected information, wherein the description of the location includes a unique identifier of a table in the content source that contains the selected information and a position of the selected information within the table, the position including a specified row and column of the table, and wherein the distinguishing attributes include headers of the table, a number of columns in the table, fonts used in the table, and a border width of the table;

storing the marked information by storing the invariant descriptor;

retrieving the marked information using the invariant descriptor;

translating the retrieved information to a different language; and displaying the translated information on the information screen;

wherein the invariant descriptor is converted into a hyperlink that contains the selected information and the invariant descriptor or a hyperlink to the selected information and the invariant descriptor.

27. The method as recited in claim 26, wherein the marked information includes audio data, wherein the audio data is translated to a different language and output.

28. A method for generating a user-sharable network user interface, comprising:

displaying a management interface for allowing a user to select and manage information displayed on an information screen of a habitat, wherein the management interface includes information of at least one content source and customization tools;

allowing the user to interact with the customization tools via a wireless device for customizing the management interface;

wherein the customization includes at least one of:
  i. adding a window to the information screen, the window being for displaying at least a portion of the marked content;
  ii. deleting a window from the information screen, the window being for displaying at least a portion of the marked content;
  iii. adding a view, the view including a plurality of windows;
  iv. deleting a view, the view including a plurality of windows;
  v. adding a row of windows to a view; and
  vi. changing user profile information;

wherein the wireless device includes at least one of a wireless telephone, a Personal Digital Assistant (PDA), a handheld computer, and a pager;

allowing the user to select portions of the information available in the at least one content source;

marking the selected information of the content source by determining an invariant descriptor of the selected information, the invariant descriptor including a description of a location of the selected information within the content source and distinguishing attributes of sub-sections of the content source that contain the selected information, wherein the description of the location includes a unique identifier of a table in the content source that contains the selected information and a position of the selected information within the table, the position including a specified row and column of the table, and wherein the distinguishing attributes include headers of the table, a number of columns in the table, fonts used in the table, and a border width of the table;

storing the marked information by storing the invariant descriptor;

retrieving the marked information using the invariant descriptor;

displaying the marked information on the information screen, wherein the information screen includes at least one view, wherein each view contains at least one window for displaying the marked information;

receiving specification of an application to invoke;

interfacing with the application for invoking the application;

receiving data from the invoked application;

displaying the data received from the invoked application on the information screen;

checking a permission status of a second user for determining whether the second user is authorized to see a window;

wherein the user sets permissions for allowing other users to view at least one of a view and a window;

allowing the second user to view a window of the information screen if the second user is authorized;

sending a notice to the second user of the sharing of the window;

wherein the second user can add content to the window;

wherein the second user can remove content from the window;

assigning identification information to data of an enterprise;

allowing users to access the data via the information screen based on access privileges;

assigning the users to groups, wherein the groups are tiered;

associating selected identification information of the enterprise data with each group;

allowing users in a particular group to access data associated with their particular access tier;

allowing users in a particular group to access data associated with a group in a lower tier;

controlling administrative privileges to the data interface system;

wherein the administrative privileges are tiered, wherein a user on a particular administrative tier has administrative rights over all users in lower administrative tiers;

wherein the administrative privileges include at least one of:
  i. adding user accounts;
  ii. deleting user accounts;
  iii. editing user accounts;
  iv. searching user accounts;
  v. setting data access privileges;
  vi. assigning users to the access tiers;
  vii. associating data with the access tiers;

wherein deleted user accounts are archived;
wherein users are assigned to groups based on an organization structure of the enterprise;
allowing an external application to access the marked information for extracting data therefrom and adding data thereto;
translating the retrieved information to a different language upon receiving a translation request; and
displaying the translated information on the information screen;
wherein the invariant descriptor is converted into a hyperlink that contains the selected information and the invariant descriptor or a hyperlink to the selected information and the invariant descriptor.

* * * * *